United States Patent
Fotso et al.

(10) Patent No.: US 12,026,759 B2
(45) Date of Patent: Jul. 2, 2024

(54) ARTIFICIAL INTELLIGENCE BASED SERVICE RECOMMENDATION

(71) Applicant: Block, Inc., Oakland, CA (US)

(72) Inventors: Stephane Fotso, San Francisco, CA (US); Zaki Ali, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/122,904

(22) Filed: Mar. 17, 2023

(65) Prior Publication Data

US 2023/0214890 A1 Jul. 6, 2023

Related U.S. Application Data

(63) Continuation of application No. 17/341,731, filed on Jun. 8, 2021, now Pat. No. 11,640,627.

(60) Provisional application No. 63/173,722, filed on Apr. 12, 2021.

(51) Int. Cl.
| | |
|---|---|
| *G06Q 30/0282* | (2023.01) |
| *G06N 3/045* | (2023.01) |
| *G06N 3/084* | (2023.01) |
| *G06N 20/00* | (2019.01) |
| *G06Q 10/0637* | (2023.01) |
| *G06Q 20/12* | (2012.01) |
| *G06Q 30/0201* | (2023.01) |
| *G06Q 30/0202* | (2023.01) |

(52) U.S. Cl.
CPC ......... *G06Q 30/0282* (2013.01); *G06N 3/045* (2023.01); *G06N 3/084* (2013.01); *G06N 20/00* (2019.01); *G06Q 10/0637* (2013.01); *G06Q 20/12* (2013.01); *G06Q 30/0201* (2013.01); *G06Q 30/0202* (2013.01)

(58) Field of Classification Search
CPC ........... G06Q 30/0282; G06Q 10/0637; G06Q 20/12; G06Q 30/0201; G06Q 30/0202; G06N 3/045; G06N 3/084; G06N 20/00
See application file for complete search history.

(56) References Cited

U.S. PATENT DOCUMENTS

| | | | |
|---|---|---|---|
| 2013/0024465 A1* | 1/2013 | Schiff | G06F 16/955 707/E17.005 |
| 2022/0101159 A1* | 3/2022 | Nigam | G06Q 50/01 |
| 2022/0327583 A1 | 10/2022 | Fotso et al. | |

* cited by examiner

Primary Examiner — Alexandru Cirnu
(74) Attorney, Agent, or Firm — Polsinelli PC

(57) ABSTRACT

In one aspect, a method includes receiving merchant profile data describing attributes of merchants; generating, using one or more machine-trained models and the merchant profile data, a respective first profile for each merchant of the merchants; generating, using the one or more machine-trained models, a respective second profile for each of the plurality of merchant services using at least one type of description for each of the plurality of merchant services, wherein the respective first profile for each merchant and the respective second profile for each of the plurality of merchant services are numerically comparable; identifying a list of merchant service recommendations for at least one of the merchants using generated first profiles and second profiles; and configuring a merchant computing device of the at least one merchant with at least one merchant service selected by the merchant from the list of merchant service recommendations.

20 Claims, 12 Drawing Sheets

ARTIFICIAL INTELLIGENCE BASED SERVICE RECOMMENDATION

CROSS-REFERENCE TO RELATED APPLICATIONS

This application is a Continuation of U.S. patent application Ser. No. 17/341,731 filed on Jun. 8, 2021, which claims the benefit of U.S. Provisional Patent Application No. 63/173,722, filed on Apr. 12, 2021, entitled "MACHINE LEARNING BASED SERVICE RANKING AND RECOMMENDATION," the content of which are incorporated herein by reference in their entirety.

TECHNICAL FIELD

The present technology pertains to systems and methods for objectively evaluating data from a business and relating the business to one or more merchant services, and more specifically pertains to evaluating business specific data and merchant service data, using one or more machine trained models, in order to derive a customized list of merchant service recommendation for each merchant.

The use of mobile and online payment platforms and business management solutions provided thereby, have been expanding over the years. Typically, payment platforms include hardware and associated software applications that can be downloaded on merchant's point of sale devices to allow merchants and customers to participate in payment transactions. These software applications provide various functionalities to the merchants allowing them to interact with their customers, process payments and manage various aspects of their respective businesses such as payroll, finance, and inventory. These functionalities have been popular with and beneficial to small and medium-size businesses, allowing them to quickly and efficiently bring their products and services to market and become fully operational businesses that generate revenues.

The types of functionalities and capabilities available for business and customer interaction management, continue to grow.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

Figure 1:
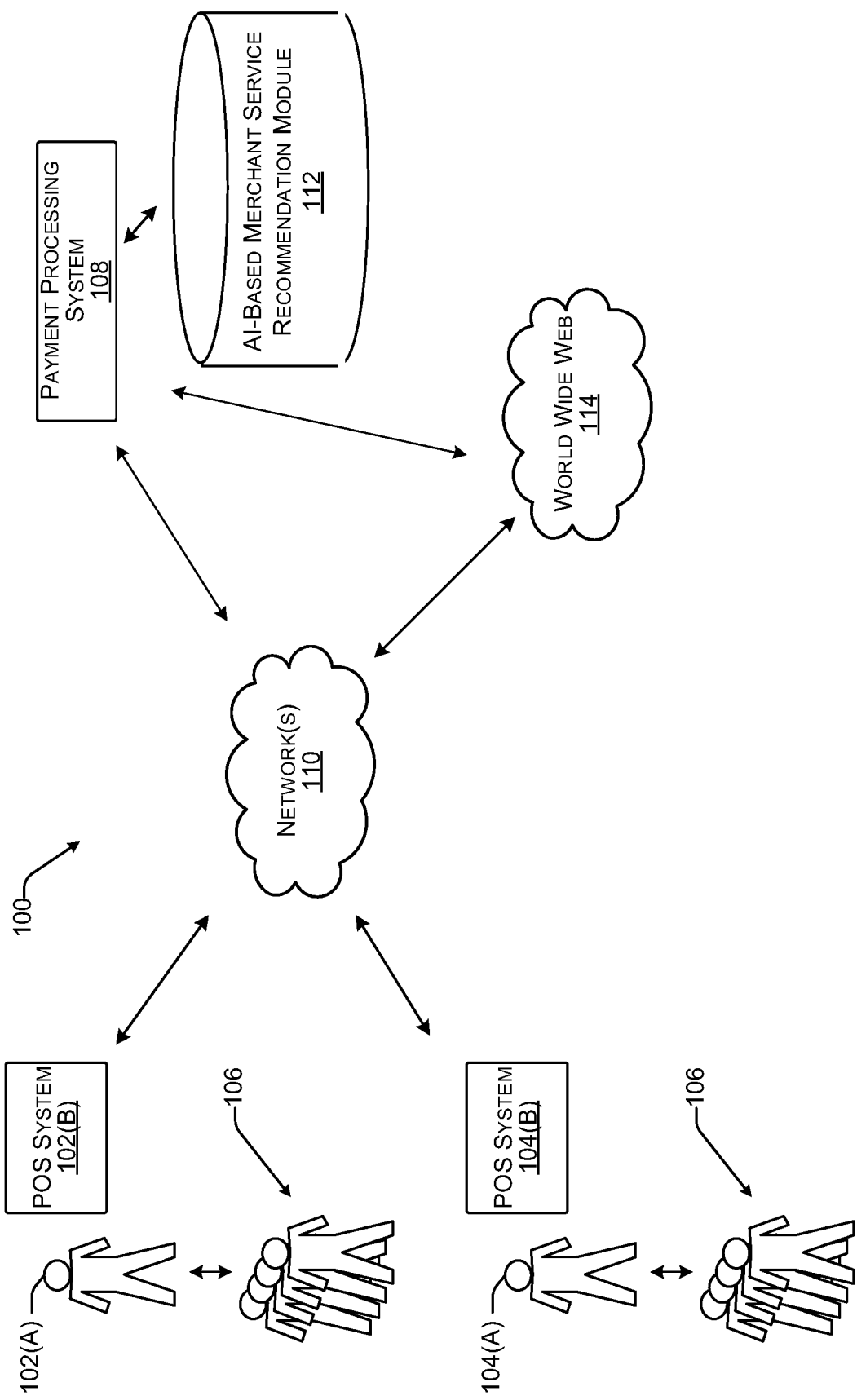
FIG. 1 illustrates an example merchant ecosystem for recommending merchant services to merchants.

Merchant services allow a merchant to operate their business. Such merchant services are also intended to improve the functioning of merchant platforms used by the merchants, the inter-operability of the merchant platforms with various components of a service provider's payment platform and/or mobile devices of their customers. Merchant services, as used hereinafter, can include any type of software application and/or hardware components accessible to merchants that can be utilized for operating their respective merchant platform and/or various aspects of their respective business. Examples of merchant services include, but are not limited to, financial services (e.g., lending, instant deposit, payroll, invoices, scheduled deposits, etc.), customer management services (e.g., gift cards, appointments, loyalty, etc.), e-commerce services for online and/or brick and mortar businesses (e.g., online checkout, online store, restaurant application, etc.), marketing and sales services (e.g., marketing application), hardware services (e.g., different types of card readers, payment readers, etc.). A merchant platform can be any type of device on which an instance of an application provided by payment service providers can be installed. Such application can configure the device as a Point-of-Sale (POS) system for conducting payment transactions with customers. Examples of a merchant platform include a tablet, a mobile device, a standalone computer with an accompanying card reader, etc.

While the intention is for these merchant services to improve the business, generally, a merchant does not have insight into which merchant services are available via payment platforms utilized by the merchants and/or which merchant service(s) are relevant at any point in time. Further, a merchant may have subscribed to multiple services with similar functionalities making it hard for the merchant to utilize the service most relevant to a specific use case. These problems only grow with the increasing number of variations in types of merchant services available to merchants via payment service systems. Furthermore, most merchants are small business owners that do not have administrative management devoted to optimizing services for use in their business. Many small business owners might not even know that such services can be of benefit to them even if they are aware of the services' existence.

The steady increase in the number or variations of different types of merchant services and functionalities results in a vast pool of incoherent data on merchants and merchant services. From a data analysis perspective, objectively analyzing this vast pool of data to arrive at a meaningful, relevant, and precise correlation between merchant services and each different merchant, is a technical challenge that needs to be addressed.

To address the challenges associated with the steady increase in the number or variations of different types of merchant services and functionalities available for business owners to implement, the present technology offers methods and systems that enhance the discovery, adoption, and management of merchant services on a merchant platform.

In one implementation, the present technology described herein, evaluates a merchant's business to identify types of merchant services that could be beneficial to the merchant, and to further surface merchant services of such types to the merchant. Further, the present technology described herein can power relevant recommendations of both first-party and third-party merchant services across different channels (brick and mortar or online) where that merchant operates. Furthermore, the present technology takes into account intelligence from services subscribed to by other merchants (such as comparable merchants) and/or existing services to which the merchant is currently subscribed, to power recommendations described above.

In some aspects, the present technology is directed to improving mobile and online payment platforms currently utilized by merchants and businesses. For example, merchants might already use a payment platform, with or without a corresponding point-of-sale device, and the present technology can be directed to adding functionalities and services to the payment platform or the point-of-sale device, though such is not necessary to take advantage of the present technology.

Moreover, to address technical challenges associated with the objective analysis of the vast pool of incoherent data on merchants and merchant services, the present technology introduces artificial intelligence based merchant service recommendation functionalities. The systems and methods disclosed herein can automate the process of recommending merchant services (whether proprietary to the provider of the payment platform or developed by independent third parties) to any given merchant that is registered with and is using the payment platform. In some aspects, the present technology utilizes artificial intelligence and one or more trained neural networks (may interchangeably be referred to as machine-trained models throughout the present disclosure) to provide the recommendations of merchant services.

The recommended merchant services may be continuously updated based on factors including, but not limited to, the available merchant services and their functionalities, merchant profile data such as the merchant's business operations, already utilized merchant services by the merchant, merchant services being utilized by comparable merchants, etc.

Example artificial intelligence merchant service recommendation functionalities described herein utilize complex numerical analyses and transformational techniques to create computer-understandable numerical representations of merchants and merchant services based on various forms of information (e.g., text, audio and/or video information) available regarding the merchants and the merchant services. In some aspects, the computer-understandable numerical representations are transformed into a common vector space such that they can be correlated and compared to provide tailored merchant service recommendations (with an optional ranking of recommended merchant services) to different merchants. As will be described in more detail below, one or more neural networks may be trained to receive numerical representations associated with merchant profile data as input to the neural network. The merchant profile data include, but are not limited to, statistics that represent a particular merchant and comparable merchants. Examples of merchant profile data includes: (1) data related to the merchant's business-related activities including information related to merchant's access to capital, payroll services, etc.; (2) the merchant's categorical information such as Merchant Category Code (MCC), business operation parameters (e.g., closures and hours of operation), location of the business, types of products that the merchant sells, information on the merchant's customers, etc.; (3) historical information on merchant services offered to and utilized (purchased) by the merchant; and/or (4) information derived from the merchant's activities including online searches for merchant service offerings. Based on the merchant profile data, the trained neural network(s) can provide a numerical representation of each merchant as output.

An additional neural network(s) may be trained to receive as input various information pertaining to merchant services that are available for purchase and use by the merchants and provides as output a numerical representation for each merchant service. The inputs to the trained neural network may be transformed versions (may be referred to as vectorized versions) of any type of available data descriptive of the merchant services. For example, there may be a text-based description of a given merchant service available on the World Wide Web. Accordingly, natural language processing techniques may be utilized to transform the text-based description into a numerical representation, which is then provided as input into the trained neural network. Similarly, there may be other forms of description for a given merchant service such as images, videos and/or audio based descriptions (e.g., promotional videos and audio descriptions). Complex transformational techniques may be utilized to transform these forms of merchant service data into numerical representations to be provided as input into the trained neural network(s). Using the vectorized merchant service data, the trained neural network(s) can provide a numerical representation of the merchant service as output.

The transformation of numerical representations of merchants and merchant services into a common vector space may be based on the use of various vectorization techniques and trained neural networks that result in shortened numerical representations of the merchants and the merchant services in the same vector space. The shortened numerical representations may then analyzed (e.g., using loss functions) to detect the correlations between them and ultimately generate a list of merchant service recommendations for each merchant (with an optional ranking of the merchant services in the list).

Outputs of the trained neural networks, e.g., numerical representations of merchants and merchant services in the same vector space, can then be compared to correlate merchant services and merchants. As will be described, correlations between these numerical representations may be determined to identify (and optionally rank) merchant services that may be specific to each merchant for inclusion in a list of merchant service recommendations.

In one implementation, the merchants and the merchant services are represented in the same vector space, so that the "closer" members of a pair, defined by <merchant, merchant service>, are to one another, the more likely the merchant is to adopt the service.

The methods for carrying out the present technology offer numerous advantages. For example, the systems and methods of the present technology include sufficient optimizations that can allow the described processes to be repeated frequently. For example, the present invention requires an analysis of a significant amount of data, and the present technology is efficient enough to repeat the disclosed methods month, weekly, or even daily. Such efficiency is important because merchants are dynamic as are the merchant services. The merchants may add a new product for sale, they may begin use of a new merchant service, they may open a new location, etc., and any of these events can cause the recommendations to be made by the present technology to change. Likewise, merchant services can add a feature or change a description about their product via a blog post, where such changes can also cause the recommendations to be made by the present technology to change. Accordingly, the present technology needs to efficiently analyze data describing the merchant and the merchant services so that the representations output by the neural networks described herein can be updated regularly. Moreover, the disclosed technology improves the sub-optimal rate of conversion of merchant services by other available tools such as e-mail based recommendation tools and improves the diversity of merchant services recommended to each merchant. These improvements are in part due to the customization and cross-platform intelligence that the present technology offers.

At the same time, the user interface for displaying and presenting recommended merchant services needs to be able to be served and rendered quickly, and on-demand. Accordingly, the present technology can include aspects wherein the analysis required to identify recommended merchant services can be performed in advance of any request for a user interface to display such recommendations. The recommendations can be stored in a database for quick retrieval when requested. The database can be frequently refreshed to include the most relevant merchant service recommendations.

The present technology also improves typical recommendation tools. Other marking tools offering merchant services to merchants are not very successful at leading to merchant adoption of the merchant services. Other recommendation tools offer products that are not appropriately matched to the merchant. The present technology significantly improves such technologies by more accurately matching merchant services to merchants. This improvement can be evaluated on the basis of a hit rate. A hit rate can be defined as the percentage of merchants recommended merchant services were adopted by the merchant to which the merchant services were recommended. The hit rate of the present technology disclosed herein was significantly higher (50%) than email-based marketing tools (27%) because of the customization and cross-platform intelligence that the disclosed technology offers. Furthermore, while traditional recommendation tools are static and generally recommend the same merchant services, the present technology disclosed herein are configured to surface diverse and unique merchant services. In terms of "diversity percentage" that is the ratio of unique number of merchant services provided within the top recommendations over all services, the disclosed technology generates a 100% diversity rate, versus email-based marketing tools at 28% and popular ranking at 8%. The traditional popular ranking method is not personalized as it recommends top k most popular merchant services based on the number of times they were adopted by merchants in the past.

The preceding summary is provided to summarize some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 illustrates an example merchant ecosystem for recommending merchant services to merchants.

Ecosystem 100 includes merchants 102(A) and 104(A). Merchant 102(A) operates a POS system 102(B) while merchant 104(A) operates a POS system 104(B). While two example merchants and corresponding POS systems are shown in FIG. 1, the number of merchants and/or their corresponding POS system(s) are not limited to those shown in FIG. 1. Ecosystem 100 can include any number of merchants operating any number of POS systems. Each of POS systems 102(B) and 104(B) can be any device with a built-in payment instrument reader (e.g., a short-range wireless communication based reader for communicatively coupling with consumer devices for processing transactions such as Near Field Communication (NFC) readers, etc.). For example, each of POS systems 102(B) and 104(B) ca, as a mobile device, a tablet, a laptop, etc., communicatively coupled to a card reader, or a software-based POS system for cardless payment transactions and/or e-commerce transactions.

In ecosystem 100, each of merchants 102(A) and 104(A), through their respective POS system 102(B) or 104(B), can transact with one or more of users 106 using their respective user devices (not shown). Each of merchants 102(A) and 104(A) may offer a particular type of product or services to users 106. The merchants 102(A) and 104(A) may be a brick and mortar store, a large multi-location retailer, an online only merchant, or a combination of online and brick and mortar, etc. Each of merchants 102(A) and 104(A) may have a corresponding profile with payment processing system 108 that includes, among other things, merchant identifying information and financial information that are utilized by payment processing system 108 to process payments for transactions between merchants 102(A) or 104(A) and one or more users 106.

In some examples of ecosystem 100, one or more components (e.g., a payment card reader) of POS systems 102(B) and 104(B) may be vendor specific and provided by payment processing system 108. Alternatively, any hardware component of POS system 102(B) and 104(B) may be developed by third-parties (i.e., other than the service provider associated with payment service system 108) while software application executing on POS system 102(B) and 104(B) may be developed and offered by payment processing system 108. POS system 102(B), 104(B), and any user device associated with any one of users 106 may communicate with payment processing system 108 via the network(s) 110.

Payment processing system 108 may be a mobile and online payment platform provider that enables merchants 102(A) and 104(A) to use their respective POS system to engage in payment transactions with customers 106. Payment processing system 108 may offer applications that merchants 102(A) and 104(A) can download and install on their respective POS system to process transactions with users 106 as well as manage various aspects of their business.

Payment processing system 108 can include an Artificial Intelligence (AI)-based merchant recommendation service 112 that can automatically generate a customized list of merchant service recommendations for each of merchants 102(A) and 104(A). In another example, instead of being a component of payment processing system 108, AI-based merchant recommendation service 112 may be an external component communicatively coupled to payment processing system 108. Each customized list of merchant service recommendations may be determined (and/or continuously updated) based on merchant specific profile data and merchant service data related to different merchant services offered by payment processing system 108 for use by merchant 102(A) and/or 104(A). Such AI-based merchant service recommendation functionalities may be enabled using AI-Based merchant service recommendation module (service) 112.

In some examples, merchant specific profile data may be collected by payment processing system 108 through monitoring and retrieving various types of information about products and services offered for sale by each merchant, information on processed transactions for each merchant, information on similar products and services offered by other merchants, and/or information about each merchant available via World Wide Web 114. In some examples, merchant service data may be available to payment processing system 108 based a merchant service's development documentations, product descriptions available on the World Wide Web 114, third-party product review and analysis sources available via the World Wide Web 114, etc.

AI-based merchant service recommendation module 112 may include one or more neural networks that may be trained to receive, as input, transformed merchant profile data and provide, as output, a numerical representation of each merchant. Example neural network architectures will be described below with reference to FIG. 8. Examples of merchant profile data includes: (1) data related to the merchant's business-related activities including information related to merchant's access to capital, payroll services, etc.; (2) the merchant's categorical information such as MCC, business operation parameters (e.g., closures and hours of operation), location of the business, types of products that the merchant sells, information on the merchant's customers, etc.; (3) historical information on merchant services offered to and utilized (purchased) by the merchant; and/or (4) information derived from the merchant's activities including online searches for merchant service offerings. Using the merchant profile data, the trained neural network(s) can provide a numerical representation of each merchant as output.

Additionally, AI-based merchant service recommendation module 112 may include one or more additional neural networks trained to receive, as input, merchant service data, and provide, as output, a numerical representation of each merchant service. The inputs to the trained neural network may be transformed versions (vectorized versions) of any type of available information on the merchant services. For example, there may be a text-based description of a given merchant service available on the World Wide Web 114. Natural language processing techniques may be utilized to transform the text-based description into a numerical representation to be provided as input to the trained neural network. Similarly, there may be various other forms of description for a given merchant service such as images, video and/or audio based descriptions (e.g., promotional videos and audio descriptions) for a given merchant service. Complex transformational techniques may be utilized to transform these forms of description of a merchant service into a numerical representation to be provided as input into the trained neural network. Using the vectorized version of the merchant service data, the trained neural network(s) can provide a numerical representation of each merchant service as output.

AI-based merchant service recommendation module 112 can then correlate numerical representations of merchants and numerical representations of merchants services using various numerical analysis (e.g., using different forms of loss functions) to identify (and/or optionally rank) merchant services that are "closely paired" with that merchant. This correlation and/or ranking process will be described in more detail below with reference to FIGS. 2 through 5.

As addressed herein, the one improvement provided by the present technology is in the better representation of the merchant, and better representation of the merchant service, whereby a better match between the merchant and merchant service can be identified. Such improvements provide benefits to the merchant that receives more relevant information, and to the provider of the merchant services whom benefits from their merchant services being surfaced to merchants in need of and likely to utilize such services.

Payment processing system 108 of FIG. 1 may offer various merchant services to merchants. Some of the merchant services might be developed by the service provider of payment processing system 108. Some of the merchant services might be provided by third-parties through payment processing system 108. A third-party as used herein means an entity other than payment processing system 108, the service provider of payment processing system 108, or the merchant. Third-parties may make their merchant services available through or on payment processing system 108 by agreeing to and abiding by various terms for offering their merchants services through the payment processing system 108.

The merchants that utilize payment services of payment processing system 108 have an account with payment processing system 108 (such as merchants 102(A) and 104(A)). As merchant services become available for purchase, through their respective POS system (e.g., POS systems 102(B) and/or 104(B) of FIG. 1), each merchant may view and install particular merchant services of interest. However, as the number of merchant services grows and/or a merchant's business grows, a merchant may not be able to efficiently identify and select merchant services that may be beneficial to the merchant's business.

In one or more examples, through performing complex numerical analysis and using trained neural networks, payment processing system 108 may also provide AI-based merchant service recommendation functionalities that can present each member merchant with a customized list of merchant services that may be of interest and use to the corresponding merchant. In some examples, the list may also be ranked. In order to implement such merchant service recommendation functionalities, disparate and unrelated sources of information that are not comparable, are transformed using various processing and numerical analyses techniques and fed through trained neural networks, that ultimately generate representations of different components (e.g., merchant services and the merchants) that can then be compared and correlated in a common vector space to generate a merchant-customized list of merchant service recommendations.

As will be described in more detail, additional advantageous aspects of this AI-based merchant service recommendation includes the recommendation of different categories of merchant services in the ranked list, higher recommendation of specific merchant services that may otherwise not be as relevant but for being associated with a higher relevant category of merchant services, etc.

There are a number of data points that may be used to generate a merchant representation (e.g., a numerical representation of each merchant) as an output of a trained neural network. Furthermore, there are a number of data points that may be used to generate a merchant service representation (e.g., a numerical representation of each available merchant service). Once merchant and merchant service numerical representations are generated, their correlations may be determined for generating a customized list of merchant service recommendations for each merchant. The customized list may be provided to each merchant on their respective POS device.

Figure 2:
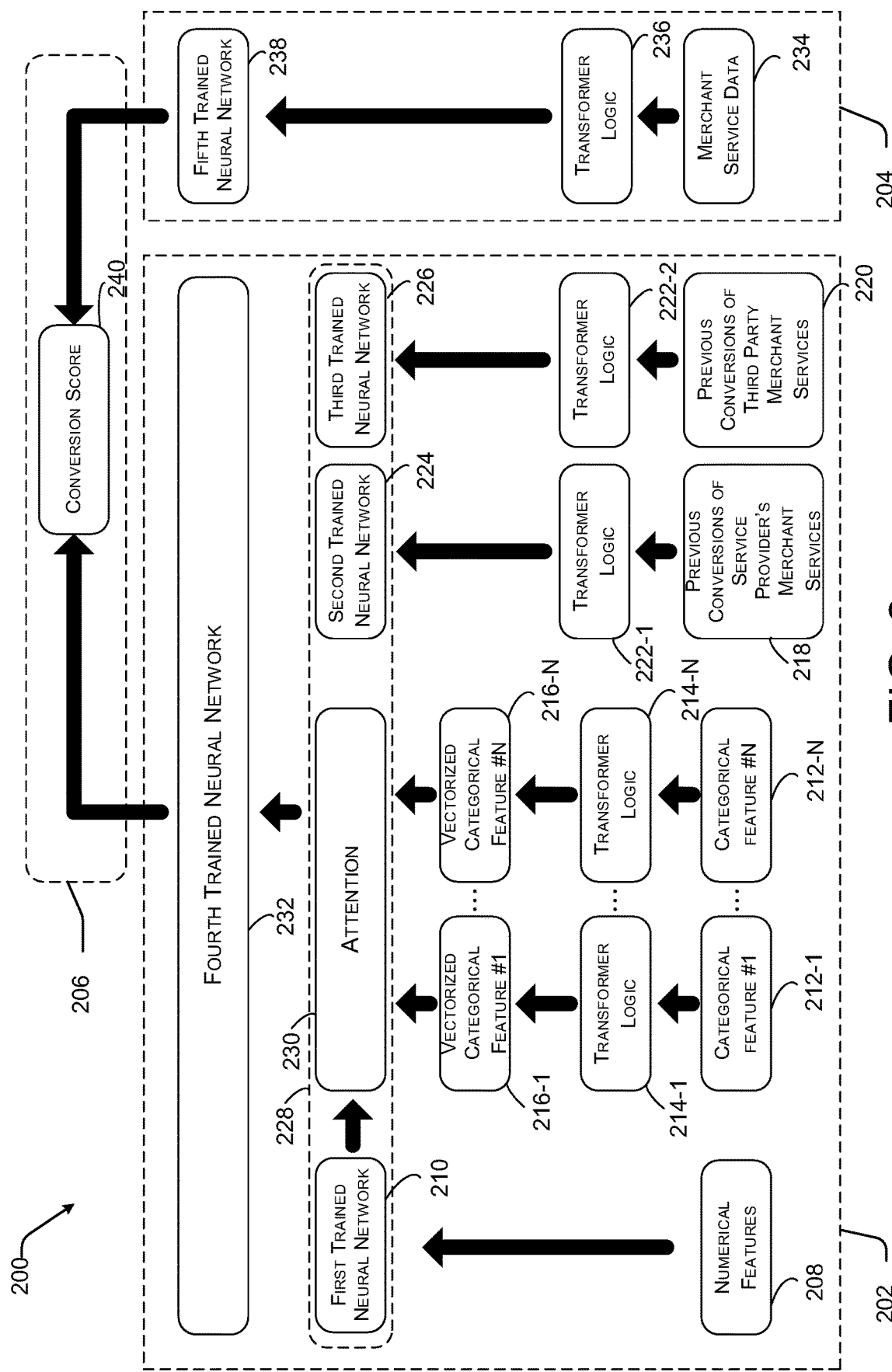
FIG. 2 illustrates an example model architecture for implementing merchant service recommendation techniques described herein.

FIG. 2 illustrates an example model architecture for implementing merchant service recommendation techniques described herein. More specifically, FIG. 2 illustrates the architecture of AI-based merchant service recommendation module 112 of FIG. 1 to generate and provide customized list of merchant service recommendations to each merchant.

Module 200 of FIG. 2 includes at least three components. The first component is a merchant component 202 used for generating a numerical representation of a merchant. Detailed functionalities of merchant component 202 will be described below with reference to FIG. 3A. The second component is a merchant service component 204 used for generating a numerical representations of a merchant service. Detailed functionalities of merchant service component 204 will be described below with reference to FIG. 3B. The third component is a correlation component 206 used for determining correlation of pairs of merchant and merchant service numerical representations to generate a customized list of merchant service recommendations for each merchant. Detailed functionalities of correlation component 206 will be described below with reference to FIG. 3C.

Merchant component 202 includes several logical elements that may be executed in sequence. First, a set of input logics receive merchant profile data. As noted above, examples of merchant profile data can include, but is not limited to, (1) data related to the merchant's business-related activities including information related to merchant's access to capital, payroll services, etc.; (2) the merchant's categorical information such as MCC, business operation parameters (e.g., closures and hours of operation), location of the business, types of products that the merchant sells, information on the merchant's customers (e.g., demographic, amounts of purchases, number of visits, etc.), merchant behavior, and the like; (3) historical information on merchant services offered to and utilized (purchased) by the merchant (converted merchant services); and/or (4) information derived from the merchant's activities including online searches for merchant service offerings such as the number of emails opened advertising merchant service offerings, amount of time spent researching and reading about specific merchant services, etc.

Merchant profile data of types (1) and (4) above may be referred to as merchant numerical features and may be collected at element 208. In some examples, there may be more numerical features associated with a merchant other than those defined in types (1) and (4) above. Numerical features of a merchant can include many numerical signals such as the number of particular promotional emails opened by the merchant (e.g., emails related to lending services or capital), the number of invoices sent out by the merchant over a pre-defined and configurable period of time, the amount of time spent by the merchant to review particular merchant services such as payment processing system 108's featured credit cards, gift cards, hardware products, etc. Collectively, a merchant's numerical features can represent both objective and subjective aspects of the corresponding merchant that might be relevant in identifying services that can be beneficial to that merchant.

Such features may be retrieved by payment processing system 108 over time by monitoring the merchant's activities and collecting information including, but not limited to, products sold by the merchant (and/or variations thereof over the years), information on customers of the merchant, changes in the merchant's business (e.g., change in location(s), size, etc.), information on the merchant's revenue, tools and raw material used, etc. This information may be stored in a datastore (e.g., datastore 744 is described below with reference to FIG. 7). Additionally, some numerical features may be retrieved from various third-party sources available via World Wide Web 114 of FIG. 1. Numerical features are then provided as input into a first trained neural network (e.g., feed-forward neural network (FFNN)) 210 which are collectively used to generate a numerical representation of the numerical features of each merchant.

Merchant profile data of type (2) above may be referred to as merchant categorical features, which may have several features such as the merchant's MCC, business operation parameters, etc. Each feature may be collected using a separate logic (e.g., an Application Programming Interface), shown as elements 212-1 to 212-N, where N is a positive integer equal to or greater than two. Alternatively, all categorical features may be collected using the same logic (e.g., just element 212-1). Each categorical feature at one of elements 212-1 to 212-N may be separately processed using transformer logics 214-1 to 214-N. Transformer logics 214-1 to 214-N can be vectorizers configured to transform text-based, image-based and/or multimedia based merchant service data into numerical vector(s) and generate categorical feature vectors 216-1 to 216-N. A non-limiting example of transformer logics 214-1 to 214-N is a Bidirectional Encoder Representations from Transformers (BERT).

Merchant profile data of type (3) above may be referred to as converted merchant services that can be separated into two different categories of conversions. The first category may be merchant services developed by payment processing system 108 and may be referred to as service provider's merchant services. Information on previous conversions of service provider's merchant services may be collected by element 218 in FIG. 2. The second category of converted merchant services may be third-party merchant services converted by a given merchant in the past and may be referred to as previous third-party merchant services conversion. Information on previous third-party merchant services conversion may be collected by element 220 in FIG. 2. Similar to categorical features 212-1 through 212-N, instances of transformer logics 222-1 and 222-2 may be applied to information at elements 218 and 220. The output of transformer logics 222-1 and 222-2 may then be fed as input into second trained neural network 224 and third trained neural network 226 (e.g., convolutional networks), respectively. Alternatively, outputs of transformer logics 222-1 and 222-2 may be fed into a single instance of a trained neural network as opposed to two separate neural networks 224 and 226.

The output of feed-forward neural network 210, vectorized categorical features 216-1 to 216-N, and outputs of convolutional neural networks 224 and 226 may each be an array of numbers, and concatenation logic 228 may concatenate these outputs. In one instance and as part of the concatenation process by logic 228 (or prior thereto), an embedding process may be applied to output of feed-forward neural network 210 and vectorized categorical features 216-1 to 216-N using logic 230. A non-limiting example of logic 230 used for such embedded layering process is the attention mechanism.

The concatenated output of logic 228 may then be fed through a fourth trained neural network 232 (which may be a feed-forward neural network as shown in FIG. 2). The output of neural network 232 is a reduced and shortened numerical representation of each merchant in a common vector space (as discussed above) that can then be compared to numerical representations of merchant services in the same common vector space (e.g., provided as the output of merchant service component 204) for purposes of generating a list of merchant service recommendations customized for each merchant.

Merchant service component 204 also includes several logical elements that may be executed in sequence. Merchant service data may be collected at element 234 and can include various information pertaining to merchant services that are available for use by the merchants. For example, there may be a text-based description of a given merchant service available on the World Wide Web 114. Alternatively and/or in addition, there may be various other forms of description for a given merchant service such as images, video and/or audio based descriptions (e.g., promotional videos and audio descriptions) for a given merchant service. Functionalities and steps of merchant service component 204 will be described in more detail below with reference to FIG. 3B.

In some examples, transformer logic 236 (which may be the same as any one of transformer logics 214-1 to 214-N, 221-1 and/or 222-2) may be applied to merchant service data to generate a numerical representation thereof. This numerical representation may then be provided as input into a fifth trained neural network 238, the output of which is a reduced numerical representation of the corresponding merchant service in the same vector space as the output of neural network 232. In one implementation, the first, second, third, fourth, and/or fifth neural networks can be the same or similar in construction and properties. Example neural network architectures to be used as first, second, third, fourth and/or fifth neural networks will be described below with reference to FIG. 8.

Correlation component 206, as will be described in more detail below, can receive as input, the output of neural network 232 (numerical representations of merchants) and the output of neural network 238 (numerical representation of merchant services), both of which are in the same vector space so that they can be compared to determine a list of merchant service recommendations for each merchant. Conversion score logic 240 can apply various types of numerical analysis (e.g., different types of loss functions) to each pair of <merchant, merchant service> to determine a degree of closeness of numerical representation of each merchant with numerical representation of each merchant service. Based on the value of each <merchant, merchant service> pair, conversion score logic 240 can generate a list of top K (with K being a positive integer greater than or equal to two) merchant services to be recommended to each merchant. Additionally, conversion score logic 240 can also rank the top K merchant services for each merchant. This process will be described in more detail below with reference to FIG. 3C.

Figure 3A:
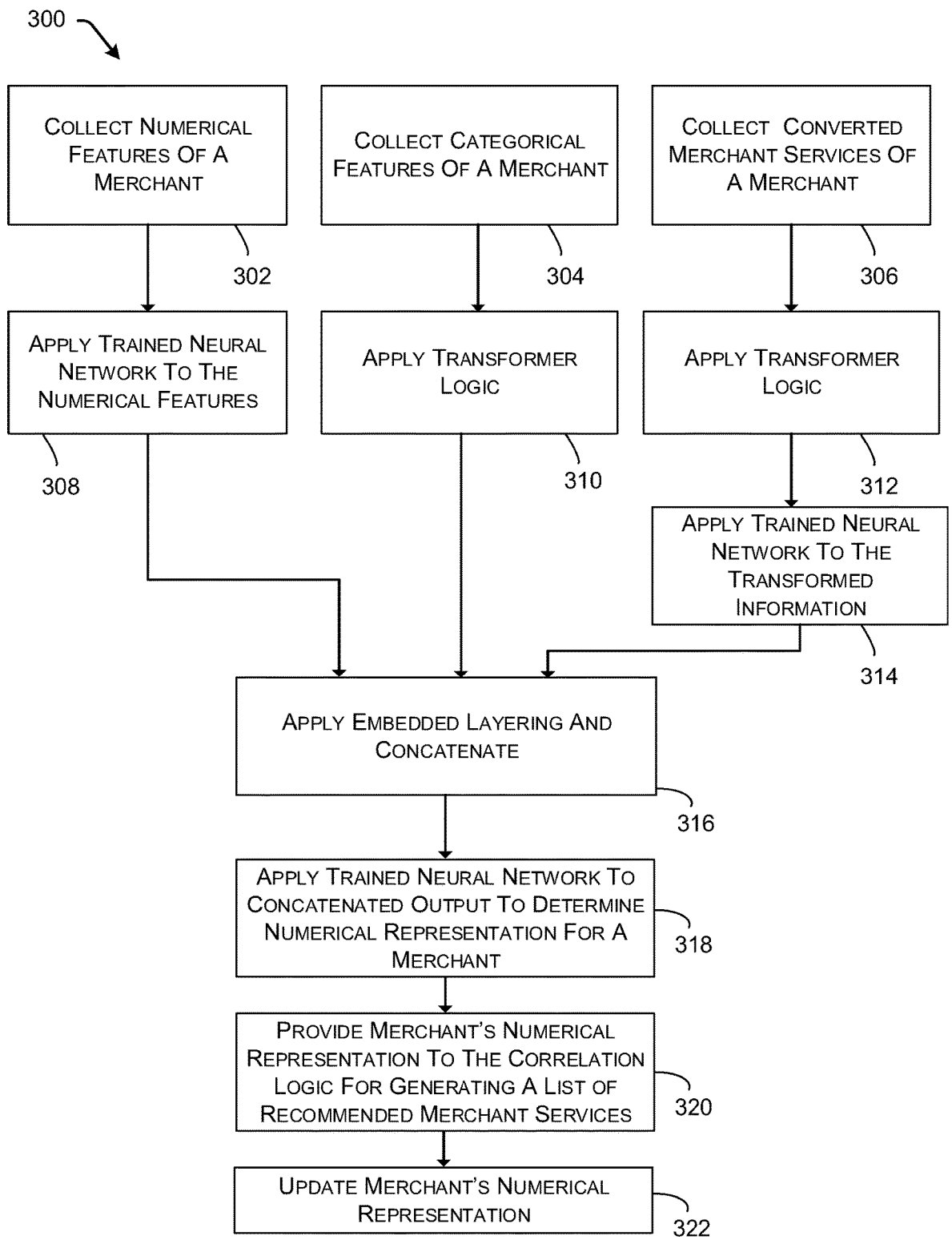
FIGS. 3A, 3B, and 3C depict example processes for implementing merchant service recommendation techniques using the model architecture of FIG. 2.
Figure 3B:
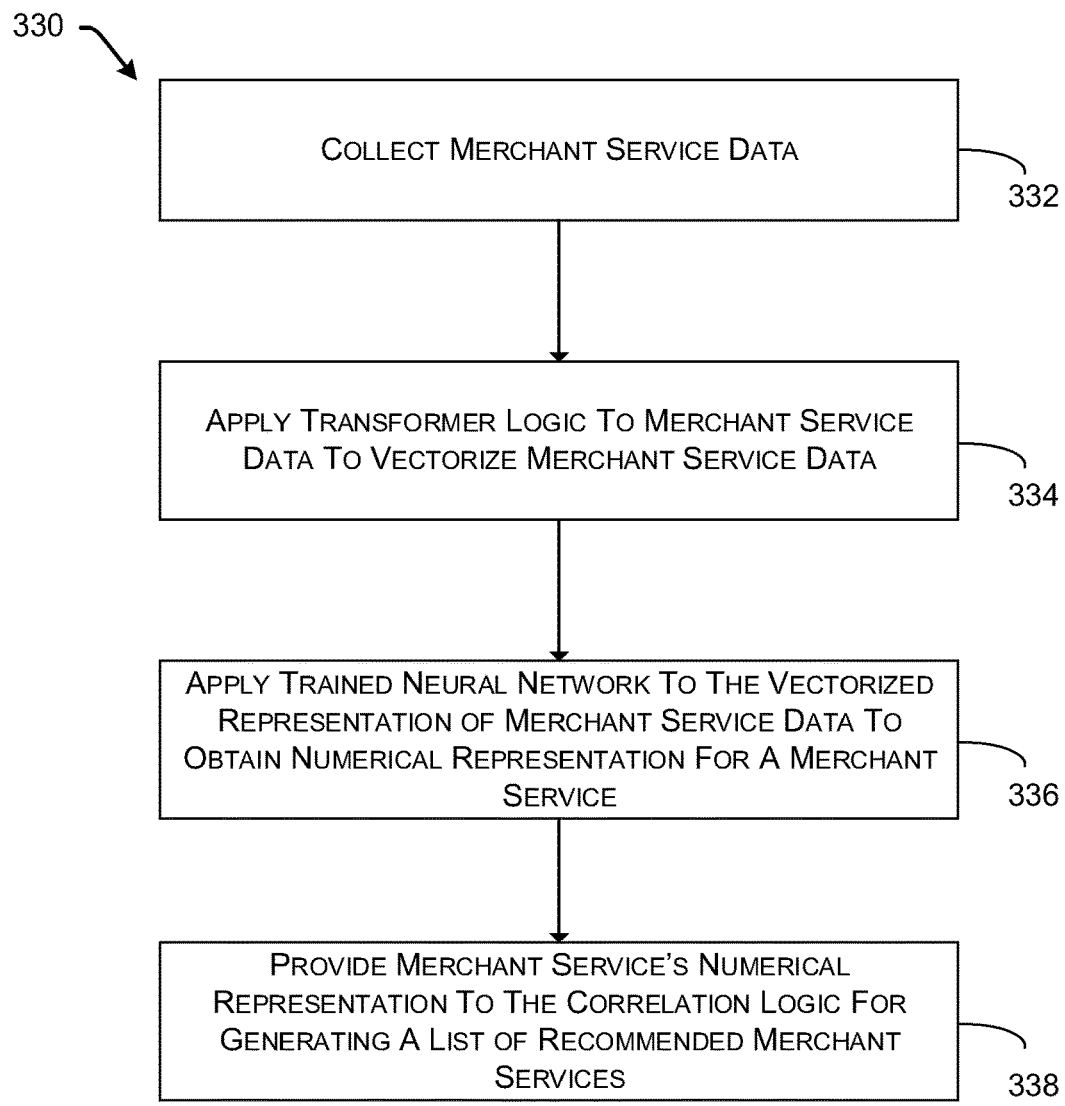
Figure 3C:
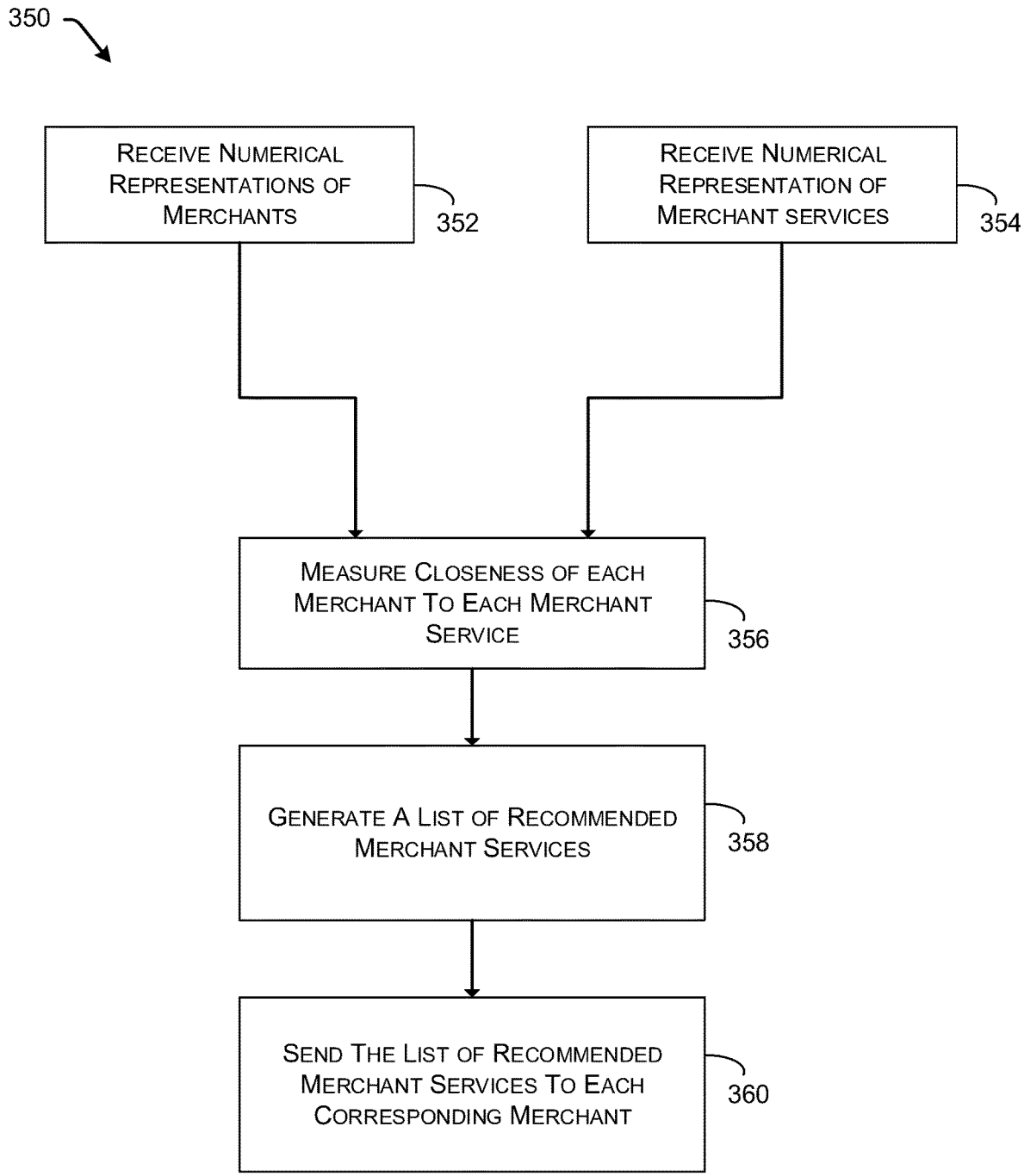

FIGS. 3A, 3B, and 3C depict example processes for implementing merchant service recommendation techniques using the system architecture of FIG. 2. Although the example processes depicts a particular sequence of operations, the sequence may be altered without departing from the scope of the present disclosure. For example, some of the operations depicted may be performed in parallel or in a different sequence that does not materially affect the function of the processes. In other examples, different components of an example device or system that implements the processes may perform functions at substantially the same time or in a specific sequence. FIG. 3A represents an example process 300 for generating numerical representations of merchants, such as merchant 102(A) and/or merchant 104(A) of FIG. 1, using various logical elements of merchant component 202 of module 200 of FIG. 2 described above.

Example process 300 may be implemented via various logical elements of merchant component 202 of module 200 of FIG. 2. As shown in FIG. 3A, different types of merchant profile data may be collected (or alternatively received) separately at blocks 302, 304 and 306. Examples of merchant profile data can include, but are not limited to, (1) the data related to merchant's business-related activities including information related to merchant's access to capital, payroll services, etc.; (2) the merchant's categorical information such as MCC, business operation parameters (e.g., closures and hours of operation), location of the business, types of products that the merchant sells, information on the merchant's customers, etc.; (3) historical information on merchant services offered to, utilized or purchased by the merchant (converted merchant services); and/or (4) information derived from the merchant's activities including online searches for merchant service offerings, such as the number of emails opened advertising a merchant service, amount of time spent researching and reading about specific merchant services, etc. Merchant profile data of types (1) and (4) may be referred to as merchant numerical features that are collected at block 302, merchant profile data of type (2) may be referred to as merchant categorical features that are collected at block 304, and merchant profile data of type (3) may be referred to as converted merchant services that are collected at block 306. The converted merchant services can be subdivided into information on previous conversions of merchant services that are proprietary to the service provider associated with payment processing system 108, and information on previous conversions of third-party merchant services.

At block 308, a trained neural network, such as trained neural network 210, may be applied to merchant numerical features to create a numerical representation of such features (e.g., an array of numbers with a size of $64^4$) for the corresponding merchant. Within this representation, merchant numerical features are compressed and nonlinearities therein are captured. In one implementation, the trained neural network is a trained feed-forward neural network.

At block 310, a transformer logic (e.g., transformer logics 214-1 . . . 214-N of FIG. 2) may be applied to each feature (e.g., features 1 to N with N being a positive integer greater than or equal to two) included in the categorical features of the corresponding merchant. By applying such transformer logic(s) to the categorical features of the merchant, vectorized categorical features 216-1 to 216-N, as described above with reference to FIG. 2, are obtained.

Similarly, at block 312, transformer logic(s) may be applied to converted merchant services. In one example, transformer logic is applied to historical information pertaining to first-party services that were adopted by a merchant through "conversion." In another example, when there is information available on the previous conversion of both third-party merchant services and proprietary merchant services of the service provider associated with payment processing system 108, separate transformer logics (e.g., transformer logics 222-1 and 222-2 of FIG. 2) may be applied to each. The output of step 312 may then be fed into a trained neural network at block 314 (e.g., trained convolutional neural network 224 and 226 of FIG. 2). In one example of the process at block 314, a trained neural network may be applied to the output of block 312 to produce a sequence of merchant service vectors that represent the M latest merchant services converted by the corresponding merchant (where M is a positive integer equal to or greater than two). In one implementation, prior to 316, a convolutional neural network may be applied to the merchant service vectors to encode the merchant service vectors (not shown).

At block 316, embedding layer logic, using for example embedding layer logic 230, may be applied to outputs of blocks 308 and 310, the results of which, together with the output of block 314 may be concatenated using concatenation logic 228 of FIG. 2. In one example, an attention layer can be used on the output of trained neural network 210 at block 308 and the vectorized categorical features at block 310. The attention layer can help create a pooling mechanism to avoid drastically increasing the dimensionality of the data and the number of parameters used, and embedding layering may be applied to avoid sparsity in the data.

At block 318, a trained neural network 232 (e.g., a 2-hidden layer feed-forward neural network) may be applied to the concatenated output of block 316 to determine a numerical representation (e.g., a non-linear and reduced numerical representation (e.g., a 64-bit numerical representation)) for the corresponding merchant that is in the same vector space as the determined numerical representations of merchant services.

At block 320, the numerical representation of each merchant is provided to correlation logic 240 for generating a list of merchant service recommendations for each merchant, as will be described below with reference to FIG. 3C.

At block 322, payment processing system 108 may update the numerical representation of each merchant periodically (e.g., once a day, once a week, etc.), where such periodicity may be a static parameter or may be determined based on factors such as the average number of transactions conducted by a merchant over a given period of time (e.g., the higher the number of transactions, the more frequent may be the updating process), the nature of the merchant's business (e.g., a numerical representation of a restaurant may have to be updated more regularly than a merchant that sells wedding dresses), etc. Depending on the updating periodicity, updated merchant profile data available via third-party services and/or via payment processing system 108, may be collected and processed per blocks 302 to 320 to generate updated numerical representations of merchants.

In one or more instances, neural networks utilized at steps 308, 314, and/or 318 may be trained and validated using information collected by payment processing system 108 before deployment and use in real-time.

FIG. 3B represents an example process 330 for generating numerical representations of merchant services using various logical elements of merchant service component 204 of FIG. 2. As shown in FIG. 3B, at block 332, merchant service data may be collected (or alternatively received) from internal database(s) of payment processing system 108 (e.g., datastore 744 which will be described below with reference to FIG. 7) or may be retrieved from the World Wide Web 114. This data may be collected at element 234 of FIG. 2.

Merchant service data may include text-based description of each merchant service (e.g., provided by service provider associated with payment processing system 108 and/or any relevant third party via World Wide Web 114). The text-based description can also include category (e.g., a distinct class that aggregates merchant services that share the same business purpose); tagline (a short slogan designed to advertise the service); and description (a multi-sentence statement providing the service characteristics).

Merchant service data may further include one or more graphical representations of each merchant service (e.g., images, visual illustrations and rendering of each merchant service, etc., available on World Wide Web 114). Merchant service data can also include multimedia based representation of each merchant service (e.g., audio or video, such as a promotional video with voice describing a particular merchant service and its functionalities, available on World Wide Web 114).

In one example, merchant service data may be collected at element 234 and from World Wide Web 114 using one or more Application Programming Interfaces (APIs), one or more Software Development Kits (SDKs), etc., that reside on one or more servers of payment processing system 108 (payment processing system 108 and various components thereof are described in more detail with reference to FIGS. 6 and 7).

At block 334, the merchant service data may be vectorized by applying transformer logic 236 of FIG. 2 thereto. A non-limiting example of such transformer logic is a Bidirectional Encoder Representations from Transformers (BERT). This transformer logic is a vectorizer that is configured to transform text-based, image-based and/or multimedia based merchant service data into a numerical vector (output of block 334).

Optionally, there may be an additional categorical flag associated with a vectorized representation of a merchant service that may be indicative of a category of services to which the merchant service belongs. For example, as part of merchant service data collected at block 332, information (e.g., text or multimedia data) indicative of a category of merchant services to which the corresponding merchant service belongs, may also be collected. Some examples of categories of merchant services include, but are not limited to, a finance category, a customer management category, a sales and marketing category, a hardware category, an accounting and tax category, an e-commerce category. Each category can have one or more merchant services associated therewith (e.g., payroll may be a specific merchant service associated with the finance category, appointments may be a specific merchant service associated with the customer service category, etc.). In one example, the category information may also be vectorized to generate the categorical flag. Categorical flags associated with different merchant service categories may then be used by conversion score logic 240 in generating the list of merchant service recommendations for each merchant. The process of using categorical flags to include category information of merchant services in the generated list will be further described below with reference to FIG. 3C.

At block 336, numerical representations for a merchant service are obtained. For example, a trained neural network (e.g., feed-forward neural network 238 of FIG. 2) may be applied to the vectorized merchant service (the numerical vector generated at block 334). The output of trained neural network at block 336 is a numerical representation (e.g., a non-linear and reduced numerical representation (e.g., a 64-bit numerical representation)) of each merchant service in the same vector space as the numerical representation of each merchant that is generated at block 318 of FIG. 3A.

At block 338, a list of merchant service recommendations is generated for each merchant. In one implementation, the numerical representation of each merchant service is provided to correlation logic 240 for generating a list of merchant service recommendations for each merchant, as will be described below with reference to FIG. 3C.

In one or more instances, neural network 238 utilized at block 336 may be trained and validated using information collected by payment processing system 108 on various merchant services that have previously been developed and/or purchased by merchants that utilize payment processing system 108.

FIG. 3C illustrates an example process 350 for correlating numerical representations determined for merchants and merchant services, per example processes of FIG. 3A and FIG. 3B respectively. In one implementation, such correlation is executed using logical element(s) of correlation component 206 of module 200 of FIG. 2 to generate a list of merchant service recommendations tailored for each different merchant.

As shown in FIG. 3C, at block 352, merchant service numerical representations (output of example process 300 of FIG. 3A at block 318) are received as input to conversion score logic 240. At block 354, merchant numerical representations 354 (output of example process 330 of FIG. 3B at block 338) are also received at conversion logic 240.

At block 356, conversion logic 240 compares each merchant numerical representation to each merchant service numerical representation to determine a measure of closeness (e.g., in the form of a numerical output) for every <merchant, merchant service> pair. In one example, a loss function, such as a pairwise loss function or a listwise loss function, may be used by conversion logic 240 to determine a measure of closeness/affinity between a given merchant service and a given merchant. In another example, a Bayesian Personalized Ranking (BPR) loss function may be utilized.

With a loss function determined for every <merchant, merchant service> pair, a threshold number of merchant services having the lowest loss function value (e.g., having the lowest 3 loss function values) may then be identified at block 358 for each merchant. These merchant services can be included in a list of merchant service recommendations for each merchant. Optionally, merchant services included in each list may be ranked with the merchant service having the lowest loss function value ranked the highest on the list and the merchant service having the highest loss function ranked the lowest on the list.

In another example, instead of comparing individual <merchants, merchant services> pairs, a listwise loss function, such as approx. Normalized Discounted Cumulative Gain (NDCG), may be deployed on the entire list of merchant services to generate an optimal ordering of the merchant services in a single step. Because the ranking function takes into account the conversion score between two merchant services by maximizing the NDCG (or minimizing negative NDCG), module 200 is trained to properly rank a merchant service against any other merchant service from among available merchant service numerical representations.

In another example, in conjunction with or instead of using loss functions for determining a list of merchant service recommendations, other techniques such as Nearest Neighbor Search (NNS) techniques may be utilized to determine an ordered list of merchant services to be recommended to each merchant. As an example of a NNS technique, clustering may be utilized where conversion score logic 240 may look at all <merchant, merchant services> distances for any given merchant to (1) split the vector space into q (with q being a positive integer equal to or greater than 1) partitions and define a centroid based on a merchant for each partition, (2) determine the closest centroid/partition, and (3) determine a merchant service or merchant services that is/are closest to the centroid in that partition. One advantage of using this approach is the reduction in computational time needed to generate rankings of merchant services for merchants while maintaining the quality of the recommended ranking and the underlying predictions.

At block 360, conversion score logic 240 can send the generated list of merchant service recommendations to the corresponding merchant to be displayed on the respective POS system of that merchant. Example user interfaces with displayed lists of merchant service recommendations will be further described below with reference to FIGS. 5A-5C.

An advantage of utilizing trained neural networks is that the list of merchant services recommended to a merchant by service provider 108 is not limited to specific merchant services but may further be refined and re-ordered based on categories of merchant services to which such merchant services belong (e.g., using the categorical flag indicative of associated category of each merchant service as described above). Such categorical flag may be a single-digit number, a two-digit number, and/or any other form of defined category identifier. In one example, information on the category of each merchant service may be vectorized in the same manner as merchant service data described with reference to FIG. 3B. Once a numerical representation of each merchant service is determined at block 336 of FIG. 3B, the categorical flag may be associated with the corresponding numerical representation such that within the list of merchant service recommendations generated at block 358, a category of each recommended merchant service is also included.

In another example, the trained neural network that generates numerical representations for merchant services may also be trained to receive as input, the vectorized category information (i.e., the categorical flags) and provide as output, two separate lists. One list may be a list of merchant service recommendations while another list may be a list of recommended categories of merchant services for a given merchant. In this way, a merchant can view the recommended categories, select one, and then view one or more available merchant services within the selected category for purchase.

In yet another example, the list of merchant service recommendations at block 358 and categorical flags vectorized at block 356 may be provided to a separate trained neural network. Such trained neural network may adjust the merchant services recommended based on the categorical flags. For example, the neural network may be trained over time and using merchant profile data to learn merchant behavior, trends, and needs to identify categories of merchant services that may be more or less relevant to a particular merchant.

As a specific example, the output of trained neural network at block 358 may be a list of four specific merchant services for merchant 102(A) including (1) Appointments (under customer management category), (2) Payroll (under finance category), (3) Loyalty (under sales and marketing category), and (4) Bluetooth Card Reader (under hardware category). The list and categorical flags representing the categories associated with the merchant services in the list may then be provided as inputs to a trained neural network, where the trained neural network determines that merchant 102(A) can benefit from more sales and marketing related merchant services as opposed to payroll services. Accordingly, such trained neural network may adjust the list generated at block 358 to provide a modified list with Loyalty ranked as number (2) on the list and Payroll ranked as number (3) on the list.

Figure 4:
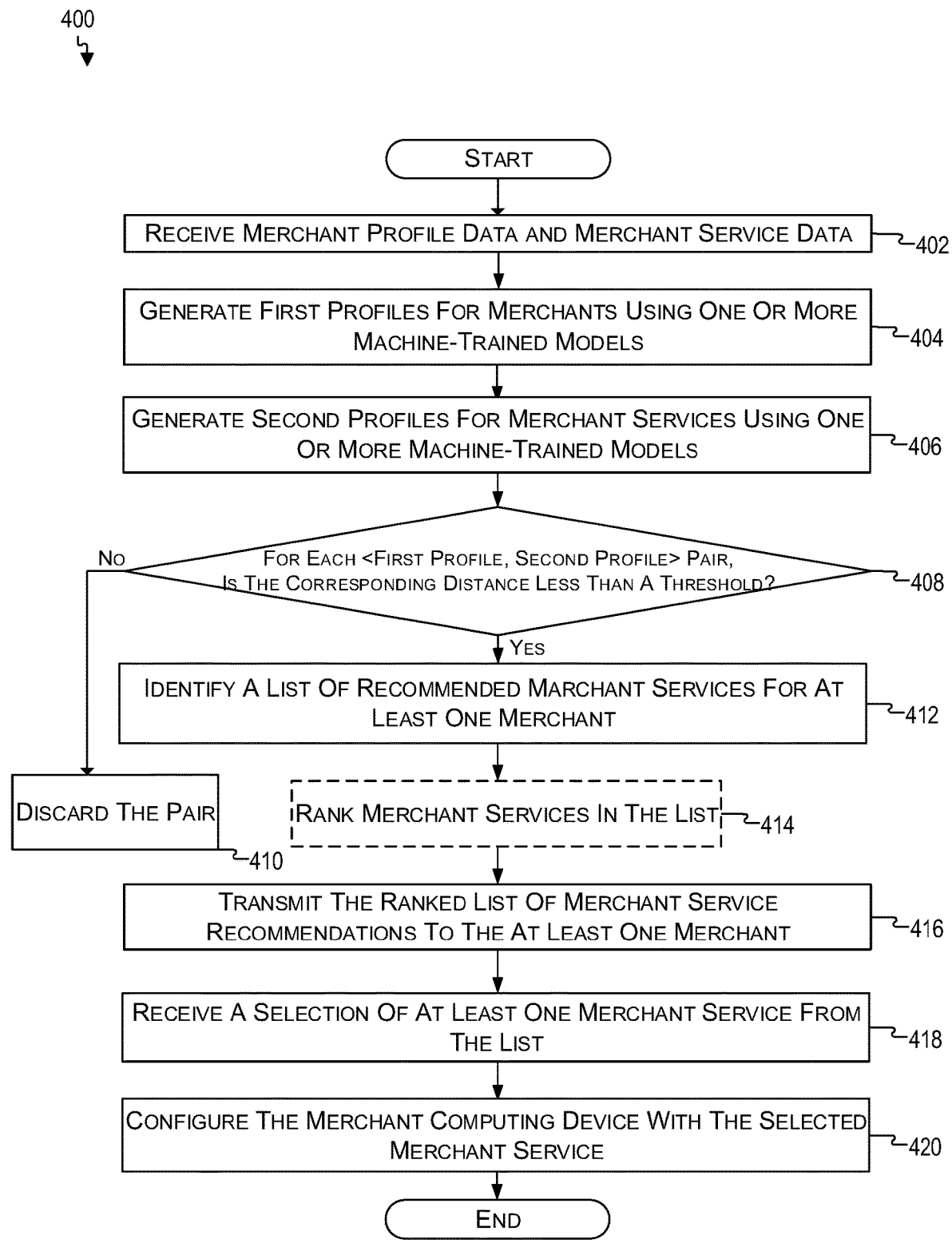
FIG. 4 is a flowchart of an example method for using machine-trained models to generate merchant service recommendations using techniques described herein.

FIG. 4 is a flowchart of a method for using machine-trained models to generate merchant service recommendations using techniques described herein. Example method 400 utilizes machine-trained models (interchangeably referred to as trained neural networks above with reference to FIGS. 1, 2, and 3A-3C) to recommend one or more merchant services to merchants having accounts with a payment service provider, such as service provider associated with payment processing system 108 of FIG. 1. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence. Method 400 of FIG. 4 will be described below from the perspective of payment processing system 108 of FIG. 1, with payment processing system 108 utilizing AI-based merchant service recommendation module 112. It will be understood by those having ordinary skill in the art that payment processing system 108 may have one or more associated memories having computer-readable instructions stored thereon, which when executed by one or more processors, configure payment processing system 108 to perform the functionalities described below. In describing method 400, references may be made to any one of FIGS. 1 through 3A-3C.

According to some examples, method 400 includes receiving, by payment processing system 108 at block 402, merchant profile data (e.g., describing attributes of merchants (e.g., merchant 102(A) and/or 104(A) of FIG. 1) and merchant service data as described above with reference to FIGS. 3A and 3B, respectively. Each of the merchants may or may not have an account with payment processing system 108. In one example, payment processing system 108 is configured to support a plurality of merchant services for use by the merchants in running and managing their respective businesses. Such services can be first-party services and as such may be associated with the payment processing system 108. Alternatively, the merchant services can be third-party merchant services.

According to some examples, method 400 further includes generating, by payment processing system 108 at block 404, first profiles (e.g., merchant numerical representations described with reference to FIG. 3A) for the merchants by applying one or more machine-trained models to merchant profile data. The one or more machine-trained models receive the merchant profile data as an input and provide, as an output, one of the first profiles for each of the merchants. Each of the first profiles representing one of the merchants is used for determining which merchant services to recommend to one of the merchants. In one example, the machine-trained model generates a vector representation of the merchant as an output (hereinafter referred to as first profiles).

In some examples, merchant profile data input may be pre-processed using logic of merchant component 202 of module 200 of FIG. 2 and applying the process of FIG. 3A. For example, payment processing system 108 may collect one or more numerical features associated with each of the merchants (and generate a numerical representation thereof (e.g., a first numerical representation by applying trained neural network 210 thereto at block 308 and applying embedding process at block 316 of FIG. 3A). The payment processing system 204 may further collect information identifying categorical features associated with each of the merchants and generate a numerical representation thereof (e.g., a second numerical representation by transformer logics 214-1 to 214-N thereto at block 310 of FIG. 3A and embedded layering at block 316 of FIG. 3A). Additionally or alternatively, payment processing system 204 may collect information on previous conversions of merchant services by each of the merchants and generate a numerical representation thereof (e.g., a third numerical representation by applying transformer logics 222-1 and 222-2 and trained neural networks 224 and 226 at blocks 312 and 314 of FIG. 3A, respectively). In some examples, payment processing system 108 may apply the concatenation process at block 316 and trained neural network 232 to the first numerical representation, the second numerical representation, and the third numerical representation to generate a corresponding first profile for each merchant.

According to some examples, method 400 further includes generating, by payment processing system 108 at block 406, second profiles (e.g., merchant service numerical representations as described above with reference to FIG. 3B) for a plurality of merchant services using one or more machine-trained models and at least one type of description (e.g., merchant service data as described above with reference to FIGS. 2 and 3B) for each of the plurality of merchant services. Each of the second profiles may represent one of the plurality of merchant services for determining which merchant service(s) to recommend to a corresponding merchant. In one example and per the process of FIG. 3B, one or more transformer logic 236 may be applied to merchant service data per block 334 of FIG. 3B that can generate a vector representation of each merchant service. One or more trained neural networks such as trained neural network 238 may then be applied to the vectorized representation of each merchant service per block 336 of FIG. 3B to generate a numerical representation of the corresponding merchant service (second profiles) that are in the same vector space as the first profiles of merchants generated at block 504.

In performing the process of generating second profiles, payment processing system 108 may determine a corresponding numerical representation of each of the plurality of merchant services by vectorizing at least one type of description for each of the plurality of merchant services. Payment processing system 108 may perform the vectorizing using transformer logic 236. Vectorizing at least one type of description may include performing a natural language to transform at least one type of description into a numerical vector representative of that type of description. A type of description for each merchant service can include text-based, image-based, audio-based, and video-based descriptions for each of the plurality of merchant services, as described above with reference to FIG. 3B. For example, a first numerical representation for a first merchant service of the plurality of merchant services may be determined by vectorizing a text-based description of the first merchant service and a second numerical representation for a second merchant service of the plurality of merchant services may be determined by vectorizing a video-based description of the second merchant service. In some examples, determining the corresponding numerical representation of each of the plurality of merchant services may be based on the transformation of at least two different types of description for a corresponding one of the plurality of merchant services retrieved from one or more online sources (e.g., via World Wide Web 114).

According to some examples, method 400 further includes determining, by payment processing system 108 and at block 408, whether a distance (e.g., a numerical distance) between any given first profile and second profile pair, <first profile, second profile>, is equal to or less than (or alternatively just less than) a configurable threshold. Such threshold may be dynamically determined based on experiments and/or empirical studies. In one example, such threshold may be determined based on the distance of every <first profile, second profile> pair such that only 10%, 20%, etc. (and/or alternatively top four, five, ten, etc.) of distances are considered for inclusion in the final list of merchant service recommendations. In some examples, the process at block 408 may be performed by correlation logic 206 of module 200 and through performance of measuring closeness of each merchant to each merchant service at block 356 of FIG. 3C.

If a given <first profile, second profile> pair is within a threshold distance ("yes" of block 408), the more likely it is that the merchant associated with the first profile will adopt the merchant service associated with the second profile of that pair. In one example, "distance" may be defined by way of a dot product between the merchant and the merchant service numerical representations in the same vector space, as determined at blocks 404 and 406, where a lower value corresponds to a higher likelihood of conversion (e.g., the closer a numerical representation of a merchant to that of a merchant service, the higher the likelihood of the merchant adopting that merchant service).

According to some examples, for any <first profile, second profile> pair with a distance greater than the threshold, method 400 further includes discarding such pair, by payment processing system 108, at block 410.

According to some examples, after pair(s) of <first profile, second profile> with corresponding distance(s) equal to or less than (or alternatively just less than) the threshold are determined, method 400 further includes identifying, by payment processing system 108 at block 412, a list of merchant service recommendations. In one instance, the list may include every pair <first profile, second profile> pair having the corresponding distance of equal to and/or less than the threshold or alternatively may include a subset of at least one such pairs (e.g., top one, two, three, four, five, etc. of the pairs having the least corresponding distance).

Accordingly, by utilizing module 200, payment service system 108 customizes recommended service(s) and/or categories of services for each merchant. A resulting customized list of merchant service recommendations may then include at least one merchant service for each category of merchant services. In another example, a resulting customized list of merchant service recommendations may include at least two merchant services corresponding to at least two different categories of merchant service. In another example, a resulting customized list of merchant service recommendations may include at least two categories of merchant services, the at least two categories of merchant services each including one or more merchant services directed to different and unrelated aspects of a merchant's business. In some examples, the corresponding categorical flag is associated with a respective second profile after the respective second profile is generated by the one or more machine-trained models or the corresponding categorical flag is provided as an additional input to the one or more machine-trained model along with a numerical transformation of a respective merchant service, as described above with reference to FIGS. 3B and 3C.

According to some examples, method 400 further includes ranking, by payment processing system 108 at block 414, merchant services in the list of recommended merchant services identified at block 412 for at least one of the merchants. The ranked list of merchant services can include a subset of the second profiles having the lowest corresponding distance value among all distance values of <first profile, second profile> pairs in the list identified at block 412. In some examples, the ranking process at block 414 may be optional. Further, the ranked list may be ordered, e.g., sequentially, chronologically, alphabetically, or based on relevance to the merchant.

In some examples, two or more merchant services may be equally distanced from the same merchant, which can translate into two or more merchants having the same ranking. Accordingly, when displayed on the merchant's POS system, the two or more merchant services may be bundled together and displayed next to each other followed by the remaining merchant services in the list (e.g., 1. Appointment and Payroll, 2. Lending, 3. Gift Cards, 4. Food Ordering).

According to some examples, method 400 includes transmitting, by payment processing system 108 at block 416, a corresponding list of recommended merchant services to at least one of the merchants. In one example, the corresponding list may be ranked per block 412. In one example, the corresponding list is transmitted to a merchant computing device of the at least one of the merchants (e.g., POS system 102(B) or POS system 104(B) of FIG. 1). The corresponding list may be transmitted over one or more networks such as the network(s) 110. The transmission of the list over one or more networks may be according to any known or to be developed means of communication between payment processing system 108 and merchant POS system 102(B) and/or 104(B). In one example, the list of merchant service recommendations may be displayed on a graphical user interface of the merchant computing device (e.g., POS system 102(B) or POS system 104(B)) with interactive controls (draw-and-drop, swipe to select, gesture to remove, etc.) to allow the merchant to interact with a specific service.

According to some examples, method 400 further includes receiving, by payment processing system 108 at block 418, a selection of a least one merchant service from the list of recommended merchant service(s), e.g., using interactive controls. The selection may be received from the merchant computing device (e.g., POS system 102(B) and/or POS system 104(B)). The selection may be received over one or more networks and according to any known or to be developed means of communication between payment processing system 108 and merchant POS system 102(B) and/or 104(B).

According to some examples, method 400 further includes configuring, by payment processing system 108 at block 420, the merchant computing device of at least one merchant with at least one merchant service selected from the list of merchant service recommendations. In one implementation, the payment processing system 108, on receiving input that a service has been selected, configures the merchant computing device to surface a first interactive element to process transactions and a second interactive element to enable the service. For example, the payment processing system 108 customizes the user interface of the merchant computing device to accommodate the selected service alongside existing services, where some of the services may be related to or similar to the selected service. In one example, if a competing service is available on the merchant computing device, the payment processing system 108 may replace or deactivate the existing service and activate the selected service to conserve computing resources. In another example, the payment processing system 108 may execute both competing services in parallel. In yet another example, the payment processing system 108 may execute both competing services in parallel but allow selective functionalities, in other words, service A may be good for functionality C and D, while service B may be good for functionality E and F. The payment processing system 108 allows bundling of functionalities and presentation of the bundled functionalities to the merchant such that a single service exists.

Figure 5A:
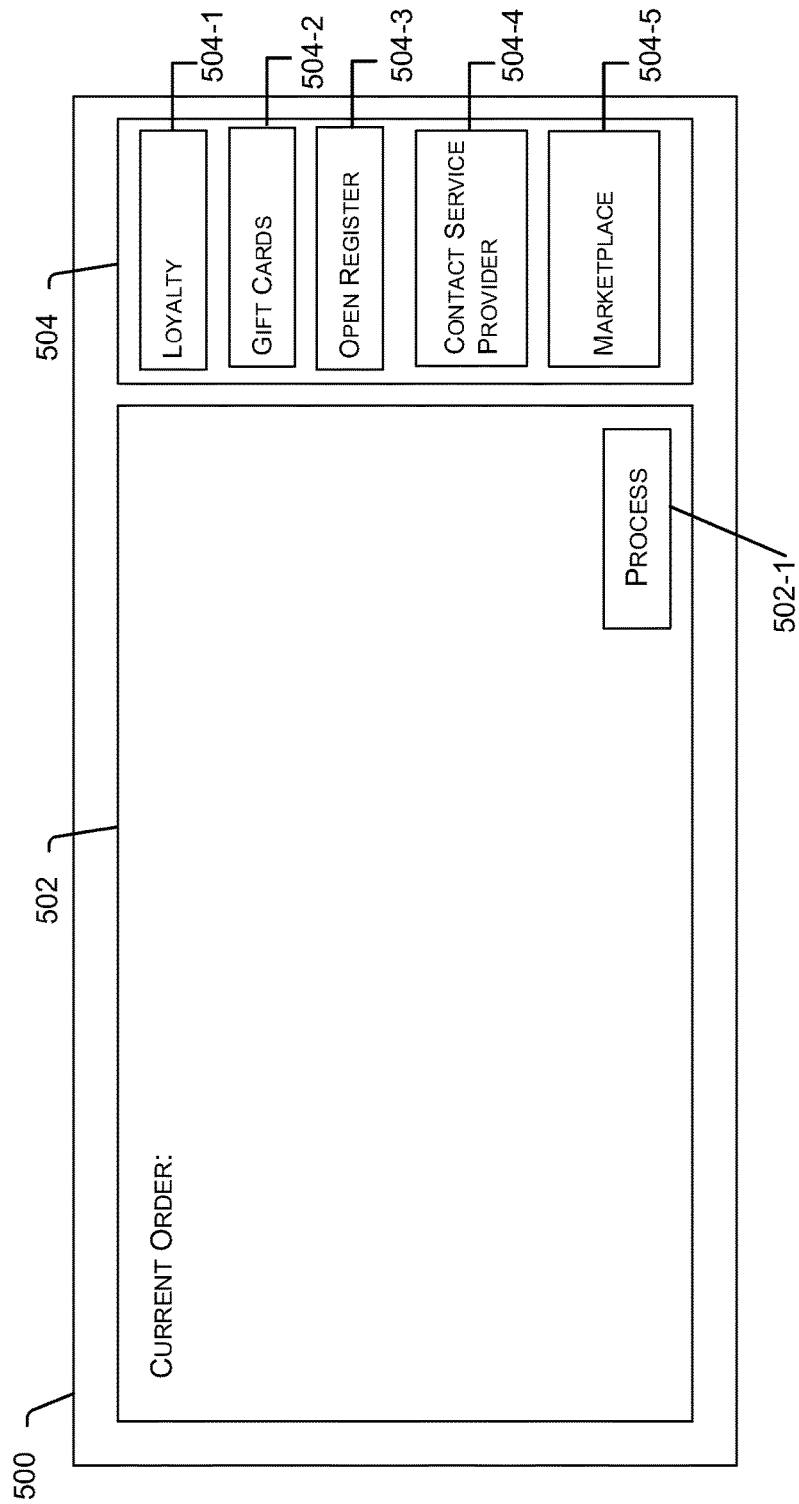
FIGS. 5A, 5B, and 5C illustrate example user interfaces with merchant service recommendations.
Figure 5B:
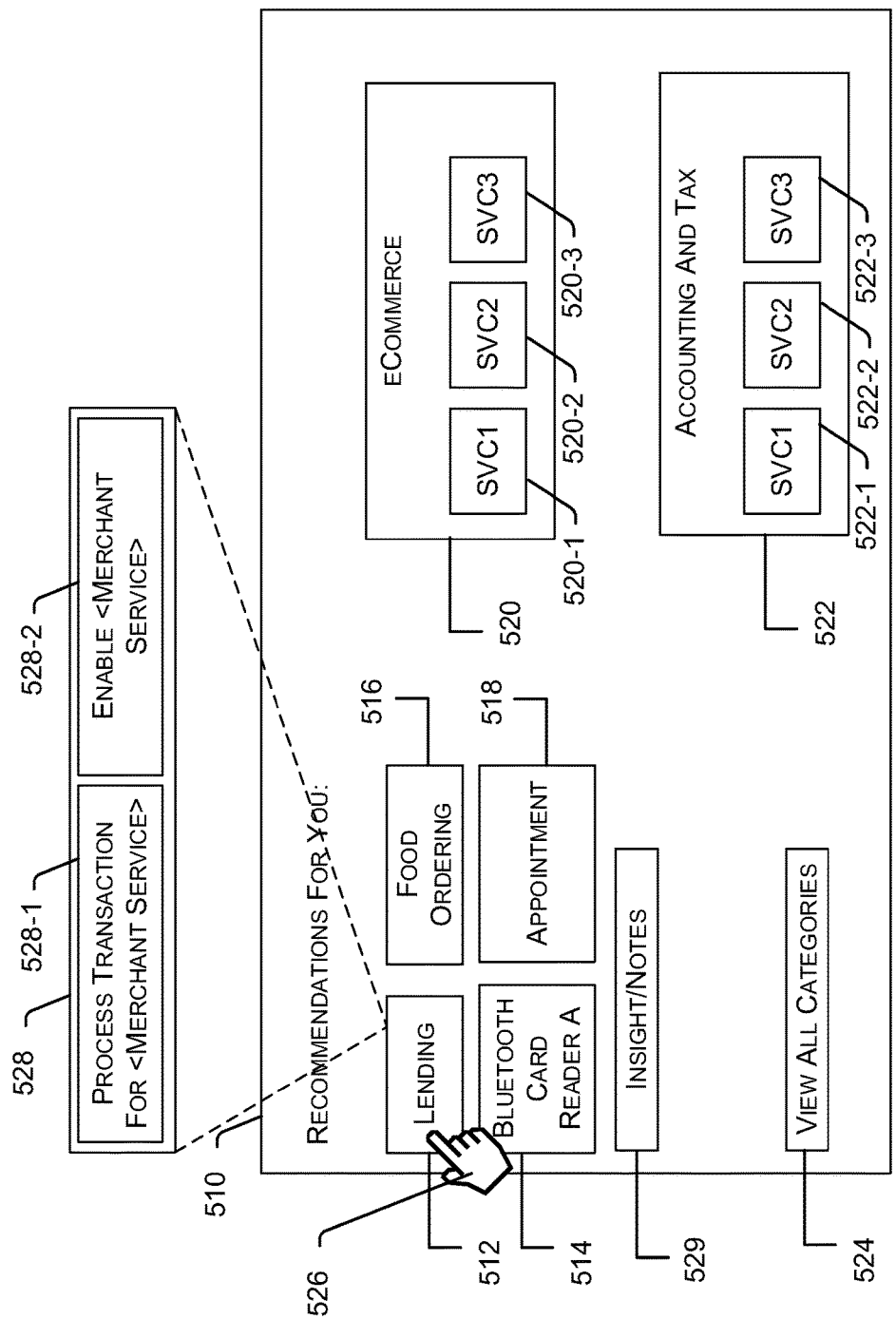
Figure 5C:
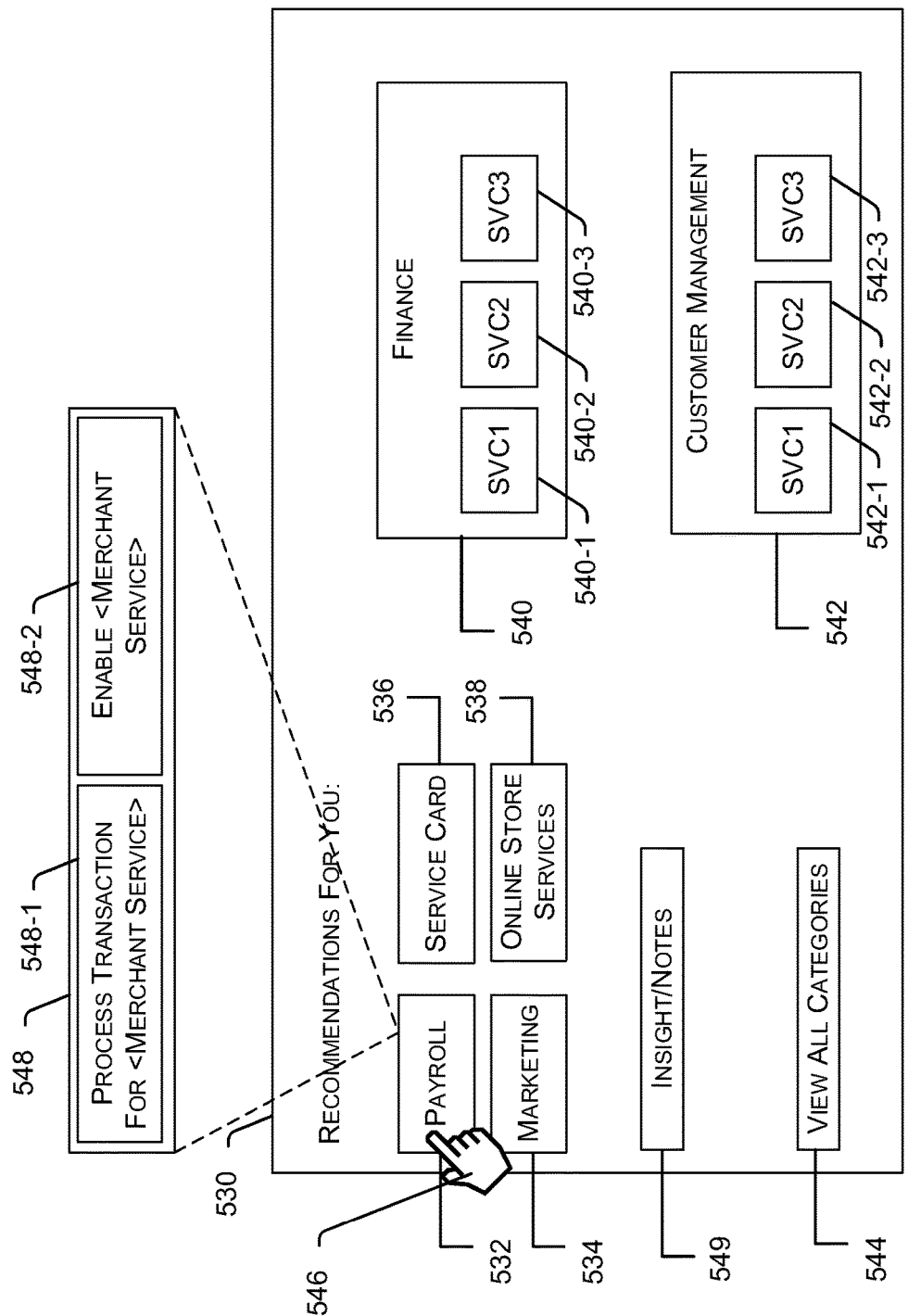

FIGS. 5A, 5B, and 5C illustrate example user interfaces with merchant service recommendations. FIG. 5A is a non-limiting depiction of a customized User Interface (UI) 500 that may be displayed on a merchant computing device (e.g., display of POS system 102(B) and/or display of POS system 104(B)). UI 500 may be a depiction of a POS application that may be installed on a merchant device. As shown, UI 500 can include, among other features, a main portion 502 and existing services/functionalities portion 504. UI 500 may be configured with touchscreen interface to accept inputs from a touch screen.

Main portion 502 may display information associated with a current transaction between a merchant (e.g., merchant 102(A) or merchant 104(A)) and a customer such as one of customers 106. Such information can include, but are not limited to, information about product(s) and/or service(s) that is/are the subject of the current transaction, customer identifying information, itemized and total cost, associated tax information, etc. By selecting process tab 502-1, the merchant may initiate processing of the current transaction using payment processing system 108.

Existing services/functionalities portion 504 may include a corresponding tab for each merchant service currently utilized by the corresponding merchant as well as tabs for managing the merchant's POS system. For example, UE 500 includes loyalty tab 504-1 and Gift Cards tab 504-2, which can be two non-limiting examples of merchant services currently in use by the merchant. Additional tabs in potion 504 include, but are not limited to, open register tab 504-3, contact service provider tab 504-4, and marketplace tab 504-5. Marketplace tab 504-5, upon selection by the merchant, may cause the display of merchant service recommendations for that merchant on the display of the merchant's POS device. Alternatively, merchant service recommendations may be displayed continuously on UI 500 without requiring the merchant to select marketplace tab 504-5.

FIG. 5B shows an example UI 510 that may be displayed on a display of POS system 102(B) when merchant 102(A) selects marketplace tab 504-5 on UI 500 of FIG. 5A. FIG. 5B illustrates an example list of merchant service recommendations personalized for merchant 102(A). This example list of merchant service recommendations for merchant 102(A) can include Lending 512, Bluetooth Card Reader A 514, Food Ordering 516, and Appointments 518. Each merchant service on the list may be an interactive tab that merchant 102(A) can click on to select and download and/or deliver (e.g., when the selected merchant service is a hardware device such as Bluetooth Card Reader A 514). Additionally, UI 510 may include a list of categories of merchant services that may be recommended by payment service system 108 to merchant 102(A) such as e-commerce category 520 and accounting and tax category 522. As also shown in FIG. 5B, each recommended category may include a number of specific merchant services (SVCs). For example, SVC1 520-1, SVC2 520-2, and SVC3 520-3 may be included as specific merchant services under the e-commerce category 520 and SVC1 522-1, SVC2 522-2, and SVC3 522-3 may be included as specific merchant services under the accounting and tax category 522.

In some examples, specific merchant services under each category may overlap with merchant services 512, 514, 516, and/or 518. In some examples and per block 414 of FIG. 4, recommended merchant services 512, 514, 516, and 518 may be ranked (e.g., have a ranking associated with them such as 1. Lending 512, 2. Bluetooth Card Reader A 514, 3. Food Ordering 516, and 4. Appointments 518). In another example, recommended categories such as e-commerce category 520 and accounting and tax category 522 may be ranked as well. In another example, in addition to categories 520 and 522, specific merchant services under each category may also be ranked.

Information about merchant service categories as shown with reference to UI 510 may be determined using categorical flags associated with each merchant service. In some examples, the use of categorical flags may result in a list of ranked merchant services that reflect particular category or categories of merchant services of interest/need to merchant 102(A). Absent the use of categorical flag, payment service system 108 may determine the ranking such that, for example, Bluetooth Card Reader A 514 is ranked first and Lending 512 is ranked second. However, due to considering categorical flag information, payment service system 108 may determine that merchant 102(A) may need additional merchant services under e-commerce category 520. Because of this determination, payment service system 108 may modify the ranking and rank Lending 512 first followed by Bluetooth Card Reader A 514, as shown in UI 510.

In some examples, UI 510 may include an additional tab 524 that enables merchant 102(A) to view all categories of merchant services (e.g., additional categories such as finance, customer management, hardware services, marketing and sales, etc.). In some examples, UI 510 may enable merchant 102(A) to click on any of the merchant service recommendations and/or categories where selecting a service recommendation configures the user interface to accommodate multiple services by embedding functionalities of existing and new services, e.g., take payments and create appointments. For example, user click 526 on Lending 512 may activate another interactive window 528 that allows merchant 102(A) to process a transaction for the selected merchant service (e.g., Lending 512) through interactive tab 528-1 and enable the selected merchant service (e.g., Lending 512) through interactive tab 528-2. In one example, enabling the selected merchant service may add the merchant service to the list of services/functionalities in portion 504 on the display of POS system 102(B). In one example, when the selected merchant service is a hardware device, selecting enable tab 528-2 may initiate a process for delivering the hardware device to merchant 102(A).

Additionally, UI 510 may include an insight/notes section 529, where payment service system 108 may provide additional recommendations to merchant 102(A). In some examples, payment service system 108 may identify merchant services converted by other merchants that sell similar products and services as merchant 102(A) and/or engage in transactions with customers in the geographical vicinity (within a configurable threshold distance) of POS system 102(B). Payment service system 108 may then determine that merchants engaged in selling beauty products typically download two merchant services together (e.g., Appointments and Gift Cards). Therefore, when merchant 102(A) (assuming that merchant 102(A) is in the business of offering beauty products) selects Appointments from the list of merchant services recommended by payment service system 108, payment service system 108 may inform merchant 102(A) that merchants who download Appointments, also download Gift Cards. Payment service system 108 may provide such insight to merchant 102(A) via insight/notes section 529 (e.g., "Merchants who have downloaded Appointments, have also downloaded Gift Cards."). As noted above, any one of specific merchant services recommended to merchant 102(A) via UI 510 may be proprietary or third-party merchant services or a combination thereof that are available via payment service system 108's marketplace.

FIG. 5C shows an example UI 530 that is customized for merchant 104(A). UI 530 may be displayed on a display of POS system 104(B) when merchant 104(A) selects marketplace tab 504-5 on UI 500 of FIG. 5A. As can be seen from comparing UI 510 and UI 530, the list of merchant service recommendations for merchant 102(A) is different than the list of merchant service recommendations for merchant 104(A). Except the difference in recommended merchant services and/or categories of merchant services, other functionalities and features of UI 530 are the same as those described above with reference to UI 510 of FIG. 5B and hence will not be further described for sake of brevity.

The example list of merchant service recommendations customized for merchant 104(A) can include Payroll 532, Marketing 534, Service Card 536 (e.g., a credit card service offered by service provider associated with payment service system 108), and Online Store Services 538. Each merchant service on the list may be an interactive tab that merchant 104(A) can click on to download and/or deliver (e.g., when the selected merchant service is a hardware device). Additionally, UI 530 may include a list of categories of merchant services that may be recommended by payment service system 108 to merchant 104(A) such as finance category 540 and customer management 542. As also shown in FIG. 5C, each recommended category may include a number of specific merchant services (SVCs). For example, SVC1 540-1, SVC2 540-2, and SVC3 540-3 may be included as specific merchant services under the e-commerce category 540 and SVC1 542-1, SVC2 542-2, and SVC3 542-3 may be included as specific merchant services under the accounting and tax category 542.

In some examples, specific merchant services under each category may overlap with merchant services 532, 534, 536, and/or 538. In some examples and per block 414 of FIG. 4, recommended merchant services 532, 534, 536, and 538 may be ranked (e.g., have a ranking associated with them such as 1. Payroll 532, 2. Marketing 534, 3. Service Card 536, and 4. 3DCart 538. In another example, recommended categories such as finance category 540 and customer management category 542 may be ranked as well. In another example, in addition to categories 540 and 542, specific merchant services under each category may also be ranked.

Information about merchant service categories as shown with reference to UI 530 may be determined using categorical flags in a similar manner as described above with reference to UI 510 of FIG. 5B and hence will not be described further for sake of brevity.

Similar to UI 510 of FIG. 5B, UI 530 may also include an additional tab 544 that enables merchant 104(A) to view all categories of merchant services. Similar to UI 510, UI 530 has functionalities whereby, merchant 104(A), via user click 546, can click on payroll 532 to activate another interactive window 548 that allows merchant 104(A) to process a transaction and download payroll 532 (using interactive tab 548-1 and interactive tab 528-4).

Additionally, UI 530 may include an insight/notes section 549, wherein payment service system 108 may provide additional recommendations to merchant 104(A) in a similar manner as described above with reference to insight/notes section 529 of FIG. 5B. Therefore, this functionality will not be further described for sake of brevity.

In some examples, ranking of merchant services and/or merchant service categories may not be numerical but instead may be visual. For example, color coding and varying font/display sizes may be utilized to indicate the ranking of each merchant service (e.g., tab 512 may be bigger than tab 514, tab 532 may be color coded differently than tab 536, etc.). Alternatively, a combination of numerical, color coding and/or font/display sizes may be used for ranking merchant services and/or merchant service categories on UI 510 and/or UI 530.

In some examples, merchant services can be surfaced on UI 510 and/or UI 530 as "Staff Picks: Top partner merchant services that may benefit a specific merchant;" "Most Popular Merchant Services: Merchant services that have seen the highest adoption of use in the past 30 days;" "New Merchant Services: Merchant services that have recently launched or have recently added significant new features;" and/or "Recommended for you: Merchant services that have been scored by the machine learning model based on the merchant's profile and past behavior."

With various non-limiting examples of AI-based service recommendation functionalities described above with reference to FIGS. 1 through 5A-5C, FIGS. 6 through 8 below provide additional details of ecosystem 100 of FIG. 1 and its various components (with reference to FIGS. 6 and 7), while FIG. 8 provides additional details of example neural networks that may be utilized as any one of trained neural networks of module 200 of FIG. 2.

Figure 6:
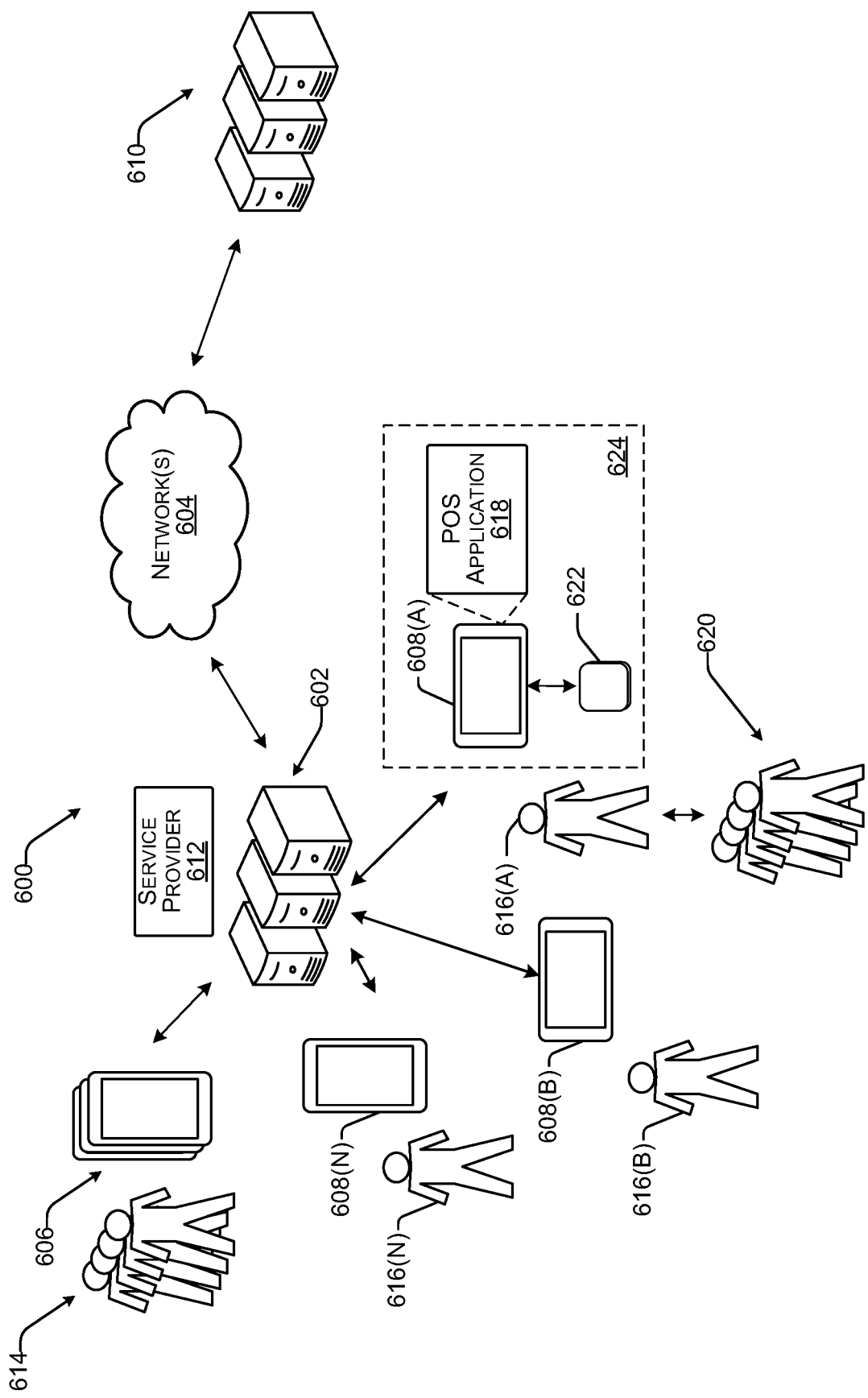
FIG. 6 illustrates an example environment for processing transactions.

FIG. 6 illustrates an example environment for processing transactions. Environment 600 includes server computing device(s) 602 that can communicate over a network 604 with user devices 606 (which, in some examples can be merchant devices 608 (individually, 608(A)-608(N))) and/or server computing device(s) 610 associated with third-party service provider(s). Server computing device(s) 602 can be associated with service provider 612 that can provide one or more services for the benefit of users 614, as described below. Actions attributed to service provider 612 can be performed by server computing device(s) 602 (which may also be referred to as payment processing system(s) or payment processing server(s) 602).

In one example, environment 600 may be a detailed version of ecosystem 100 of FIG. 1, service computing device(s) 602 may be the same as payment service system 108 of FIG. 1, and users 614 may be the same as users 106 of FIG. 1.

Environment 600 can include a plurality of user devices 606 associated with users 614. Each one of the plurality of user devices 606 can be any type of computing device, such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of user devices 606 can be operable by one or more of users 614. Users 614 can be referred to as customers, buyers, merchants, sellers, borrowers, employees, employers, payors, payees, couriers and so on. Users 614 can interact with user devices 606 via user interfaces presented via user devices 606. In at least one example, a user interface can be presented via a web browser, or the like. In other examples, a user interface can be presented via an application, such as a mobile application or desktop application, which can be provided by service provider 612 or which can be an otherwise dedicated application. In some examples, individual user devices 606 can have an instance or versioned instance of an application, which for example can be downloaded from an application store and which can present the user interface(s) described herein. In at least one example, a user 614 can interact with the user interface via touch input, spoken input, or any other type of input.

As described above, in at least one example, users 614 can include merchants 616 (individually, 616(A)-616(N)). Merchants 616 can be the same as merchants 102(A) and 104(A) of FIG. 1. In an example, merchants 616 can operate respective merchant devices 608, which can be user devices 606 configured for use by merchants 616. For the purpose of this discussion, a "merchant" can be any entity that offers items (e.g., goods or services) for purchase or other means of acquisition (e.g., rent, borrow, barter, etc.). Merchants 616 can offer items for purchase or other means of acquisition via brick-and-mortar stores, mobile stores (e.g., pop-up shops, food trucks, etc.), online stores, combinations of the foregoing, and so forth. In some examples, at least some of merchants 616 can be associated with a same entity but can have different merchant locations and/or can have franchise/franchisee relationships. In additional or alternative examples, merchants 616 can be different merchants. That is, in at least one example, merchant 616(A) can be a different merchant than merchant 616(B) and/or the merchant 616(C) (e.g., N can be an integer equal to or greater than 3. Therefore, in this particular non-limiting example merchant 616(C) can be merchant 616(N) when N=3 in FIG. 6).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 608 can have an instance of a Point of Sale (POS) application 618 stored thereon. POS application 618 can configure a merchant device 608 (e.g., merchant device 608(A)) as a POS terminal, which enables merchant 616(A) to interact with one or more customers 620. As described above, users 614 can include customers, such as the customers 620 shown as interacting with the merchant 616(A). For the purpose of this discussion, a "customer" can be any entity that acquires items from merchants. While only two customers 620 are illustrated in FIG. 6, any number of customers 620 can interact with merchants 616. Further, while FIG. 6 illustrates customers 620 interacting with merchant 616(A), customers 620 can interact with any of merchants 616.

In at least one example, interactions between customers 620 and merchants 616 that involve the exchange of funds (from customers 620) for items or services (from merchants 616) can be referred to as "POS transactions" and/or "transactions." In at least one example, POS application 618 can determine transaction data associated with the POS transactions. Transaction data can include payment information, which can be obtained from a reader device 622 associated with the merchant device 608(A), user authentication data, purchase amount information, point-of-purchase information (e.g., item(s) purchased, date of purchase, time of purchase, etc.), etc. POS application 618 can send transaction data to the server computing device(s) 602. Furthermore, POS application 618 can present a UI to enable merchant 616(A) to interact with POS application 618 and/or service provider 112 via POS application 618.

In at least one example, merchant device 608(A) can be a special-purpose computing device configured as a POS terminal (via the execution of the POS application 618). In at least one example, the POS terminal may be connected to a reader device 622, which is capable of accepting a variety of payment instruments, such as credit cards, debit cards, gift cards, short-range communication based payment instruments, and the like, as described below. In at least one example, reader device 622 can plug in to a port in merchant device 608(A), such as a microphone port, a headphone port, an audio-jack, a data port, or other suitable port. In additional or alternative examples, reader device 622 can be coupled to merchant device 608(A) via another wired or wireless connection, such as via a Bluetooth®, BLE, and so on. Additional details are described below with reference to FIG. 7. In some examples, reader device 622 can read information from alternative payment instruments including, but not limited to, wristbands and the like.

In some examples, reader device 622 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with reader device 622, and communicate with server computing device(s) 602, which can provide, among other services, a payment processing service. Server computing device(s) 602 associated with the service provider 612 can communicate with server computing device(s) 610, as described below. In this manner, the POS terminal and reader device 622 may collectively process transaction(s) between the merchants 616 and customers 620. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, POS terminal 608(A) and reader device 622 of POS system 624 are shown as separate devices, in additional or alternative examples, POS terminal 608(A) and the reader device 622 can be part of a single device. In some examples, reader device 622 can have a display integrated therein for presenting information to customers 620. In additional or alternative examples, POS terminal 608(A) can have a display integrated therein for presenting information to customers 620. POS systems, such as the POS system 624, may be mobile, such that POS terminals and reader devices may process transactions in disparate locations across the world. POS systems can be used for processing card-present transactions and card-not-present (CNP) transactions, as described below. In one example POS system 624 can be the same as any one of POS systems 102(B) and 104(B) of FIG. 1.

A card-present transaction is a transaction where both a customer 620 and his or her payment instrument are physically present at the time of the transaction. Card-present transactions may be processed by swipes, dips, taps, or any other interaction between a physical payment instrument (e.g., a card), or otherwise present payment instrument, and a reader device 622 whereby reader device 622 is able to obtain payment data from the payment instrument. A swipe is a card-present transaction where a customer 620 slides a card, or other payment instrument, having a magnetic strip through a reader device 622 that captures payment data contained in the magnetic strip. A dip is a card-present transaction where a customer 620 inserts a payment instrument having an embedded microchip (i.e., chip) into a reader device 622 first. The dipped payment instrument remains in the payment reader until reader device 622 prompts customer 620 to remove the card, or other payment instrument. While the payment instrument is in reader device 622, the microchip can create a one-time code which is sent from POS system 624 to server computing device(s) 610 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 620 may tap or hover his or her payment instrument (e.g., card, electronic device such as a smart phone running a payment application, etc.) over a reader device 622 to complete a transaction via short-range communication (e.g., NFC, RFID, Bluetooth®, BLE, etc.). Short-range communication enables the payment instrument to exchange information with reader device 622. A tap may also be called a contactless payment.

A Card Not Present (CNP) transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

POS system 624, server computing device(s) 602, and/or server computing device(s) 610 may exchange payment information and transaction data to determine whether transactions are authorized. For example, POS system 624 may provide encrypted payment data, user authentication data, purchase amount information, point-of-purchase information, etc. (collectively, transaction data) to server computing device(s) 602 over network(s) 604. Server computing device(s) 602 may send the transaction data to server computing device(s) 610. As described above, in at least one example, server computing device(s) 610 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. Acquirer (e.g., the server computing device(s) 610 associated therewith) can send a fund transfer request to a server computing device of a card payment network (e.g., Mastercard®, VISA®, etc.) to determine whether the transaction is authorized or deficient. In at least one example, service provider 612 can serve as an acquirer and connect directly with the card payment network.

The card payment network (e.g., server computing device(s) 610 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., server computing device(s) 610 associated therewith) can make a determination as to whether the customer has the capacity to absorb the relevant charge associated with the payment transaction. In at least one example, service provider 612 can serve as an issuer and/or can partner with an issuer. The transaction is either approved or rejected by the issuer and/or the card payment network (e.g., server computing device(s) 610 associated therewith), and a payment authorization message is communicated from the issuer to the POS device via a path opposite of that described above, or via an alternate path.

As described above, server computing device(s) 610, which can be associated with payment service provider(s), may determine whether the transaction is authorized based on the transaction data, as well as information relating to parties to the transaction (e.g., the customer 620 and/or the merchant 616(A)). Server computing device(s) 610 may send an authorization notification over the network(s) 604 to server computing device(s) 602, which may send the authorization notification to POS system 624 over the network(s) 104 to indicate whether the transaction is authorized. Server computing device(s) 602 may also transmit additional information such as transaction identifiers to POS system 624. In one example, server computing device(s) 602 may include a merchant application and/or other functional components for communicating with POS system 624 and/or server computing device(s) 610 to authorize or decline transactions.

Based on the authentication notification that is received by POS system 624 from server computing device(s) 602, merchant 616(A) may indicate to customer 620 whether the transaction has been approved. In some examples, approval may be indicated at POS system 624, for example, at a display of POS system 624. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, service provider 612 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, users 614 can access all of the services of service provider 612. In other examples, users 614 can have gradated access to the services, which can be based on risk tolerance, IDV outputs, subscriptions, and so on. In at least one example, access to such services can be availed to merchants 616 via POS application 618. In additional or alternative examples, each service can be associated with its own access point (e.g., application, web browser, etc.).

Service provider 612 can offer payment processing services for processing payments on behalf of the merchants 616, as described above. For example, the service provider 612 can provision payment processing software, payment processing hardware and/or payment processing services to merchants 616, as described above, to enable merchants 616 to receive payments from customers 620 when conducting POS transactions with the customers 620. For instance, the service provider 612 can enable merchants 616 to receive cash payments, payment card payments, and/or electronic payments from customers 620 for POS transactions and service provider 612 can process transactions on behalf of merchants 616.

As service provider 612 processes transactions on behalf of merchants 616, service provider 612 can maintain accounts or balances for merchants 616 in one or more ledgers. For example, service provider 612 can analyze transaction data received for a transaction to determine an amount of funds owed to a merchant 616(A) for the transaction. In at least one example, such an amount can be a total purchase price less fees charged by service provider 612 for providing the payment processing services. Based on determining the amount of funds owed to merchant 616(A), service provider 612 can deposit funds into an account of merchant 616(A). The account can have a stored balance, which can be managed by service provider 612. The account can be different from a conventional bank account at least because the stored balance is managed by a ledger of service provider 612 and the associated funds are accessible via various withdrawal channels including, but not limited to, scheduled deposit, same-day deposit, instant deposit, and a linked payment instrument.

A scheduled deposit can occur when service provider 612 transfers funds associated with a stored balance of merchant 616(A) to a bank account of merchant 616(A) that is held at a bank or other financial institution (e.g., associated with server computing device(s) 610). Scheduled deposits can occur at a prearranged time after a POS transaction is funded, which can be a business day after the POS transaction occurred, or sooner or later. In some examples, merchant 616(A) can access funds prior to a scheduled deposit. For instance, merchant 616(A) may have access to same-day deposits (e.g., wherein service provider 612 deposits funds from the stored balance to a linked bank account of the merchant on a same day as POS transaction, in some examples prior to the POS transaction being funded) or instant deposits (e.g., wherein service provider 612 deposits funds from the stored balance to a linked bank account of the merchant on demand, such as responsive to a request). Further, in at least one example, the merchant 616(A) can have a payment instrument that is linked to the stored balance that enables the merchant to access the funds without first transferring the funds from the account managed by service provider 612 to the bank account of merchant 616(A).

In at least one example, service provider 612 may provide various merchant services in addition to merchant services described above with reference to FIGS. 1 through 5A-5C. One example of such merchant services is inventory management services. That is, service provider 612 may provide inventory tracking and reporting. Inventory management services may enable merchant 616(A) to access and manage a database storing data associated with a quantity of each item that merchant 616(A) has available (i.e., an inventory). Furthermore, in at least one example, service provider 612 can provide catalog management services to enable merchant 616(A) to maintain a catalog, which can be a database storing data associated with items that merchant 616(A) has available for acquisition (i.e., catalog management services). In at least one example, the catalog may include a plurality of data items and a data item of the plurality of data items may represent an item that merchant 616(A) has available for acquisition. Service provider 612 can offer recommendations related to pricing of the items, placement of items on the catalog, and multi-party fulfilment of the inventory.

In another example of merchant services, service provider 612 can provide business banking services, which allow merchant 616(A) to track deposits (from payment processing and/or other sources of funds) into an account of merchant 616(A), payroll payments from the account (e.g., payments to employees of merchant 616(A)), payments to other merchants (e.g., business-to-business) directly from the account or from a linked debit card, withdrawals made via scheduled deposit and/or instant deposit, etc. Furthermore, the business banking services can enable merchant 616(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable merchants 116 to visualize their cash flow to track their financial health, set aside money for upcoming obligations (e.g., savings), organize money around goals, etc.

In another example of merchant services, service provider 612 can provide financing services and products, such as via business loans, consumer loans, fixed term loans, flexible term loans, and the like. In at least one example, service provider 612 can utilize one or more risk signals to determine whether to extend financing offers and/or terms associated with such financing offers.

In another example of merchant services, service provider 612 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, service provider 612 can offer different types of capital loan products. For instance, in at least one example, service provider 612 can offer a daily repayment loan product, wherein a capital loan is repaid daily, for instance, from a portion of transactions processed by the payment processing service on behalf of the borrower. Additionally and/or alternatively, service provider 612 can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, service provider 612 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of merchants 616. Service provider 612 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by service provider 612 (e.g., from payments owed to the merchant from payments processed on behalf of the merchant, funds transferred to the merchant, etc.). Service provider 612 can offer specific financial products, such as payment instruments, tied specifically to the loan products. For example, in one implementation, server provider 612 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

In another example of merchant services, service provider 612 can provide web-development services, which enable users 614 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts, for example. In some examples, the resulting web page(s) and/or other content items can be used for offering item(s) for sale via an online/e-commerce platform. That is, the resulting web page(s) and/or other content items can be associated with an online store or offering by the one or more of merchants 616. In at least one example, service provider 612 can recommend and/or generate content items to supplement omni-channel presences of merchants 616. That is, if a merchant 616 of merchants 616 has a web page, service provider 612—via the web-development or other services—can recommend and/or generate additional content items to be presented via other channel(s), such as social media, email, etc.

In another example of merchant services, service provider 612 can provide payroll services to enable employers to pay employees for work performed on behalf of employers. In at least one example, service provider 612 can receive data that includes time worked by an employee (e.g., through imported timecards and/or POS interactions), sales made by the employee, gratuities received by the employee, and so forth. Based on such data, service provider 612 can make payroll payments to employee(s) on behalf of an employer via the payroll service. For instance, service provider 612 can facilitate the transfer of a total amount to be paid out for the payroll of an employee from the bank of the employer to the bank of service provider 612 to be used to make payroll payments. In at least one example, when the funds have been received at the bank of service provider 612, service provider 612 can pay the employee, such as by check or direct deposit, often a day, a week, or more after when the work was actually performed by the employee. In additional or alternative examples, service provider 612 can enable employee(s) to receive payments via same-day or instant deposit based at least in part on risk and/or reliability analyses performed by service provider 612.

In another example of merchant services, in at least one example, service provider 612 can provide employee management services for managing schedules of employees. Further, service provider 612 can provide appointment services for enabling users 614 to set schedules for scheduling appointments and/or users 614 to schedule appointments.

In another example of merchant services, service provider 612 can provide restaurant management services to enable users 614 to make and/or manage reservations, to monitor front-of-house and/or back-of-house operations, and so on. In such examples, merchant device(s) 608 and/or server computing device(s) 602 can be configured to communicate with one or more other computing devices, which can be located in the front-of-house (e.g., POS device(s)) and/or back-of-house (e.g., kitchen display system(s) (KDS)). In at least one example, service provider 612 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In another example of merchant services, service provider 612 can provide fulfilment services, which can use couriers for delivery, wherein couriers can travel between multiple locations to provide delivery services, photography services, etc. Couriers can be users 614 who can travel between locations to perform services for a requesting user 614 (e.g., deliver items, capture images, etc.). In some examples, the courier can receive compensation from service provider 612. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, service provider 612 can receive requests for courier services, automatically assign the requests to active couriers, and communicate dispatch instructions to couriers via user interface (e.g., application, web browser, or other access point) presented via respective devices 606.

In another example of merchant services, service provider 612 can provide omni-channel fulfillment services. For instance, if a customer places an order with a merchant and the merchant cannot fulfill the order because one or more items are out of stock or otherwise unavailable, service provider 612 can leverage other merchants and/or sales channels that are part of the platform of service provider 612 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, service provider 612 can enable conversational commerce via conversational commerce services, which can use one or more machine learning mechanisms to analyze messages exchanged between two or more users 614, voice inputs into a virtual assistant or the like, to determine intents of user(s) 614. In some examples, service provider 612 can utilize determined intents to automate customer service, offer promotions, provide recommendations, or otherwise interact with customers in real-time. In at least one example, service provider 612 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, service provider 612 can provide a peer-to-peer payment service that enables peer-to-peer payments between two or more users 614. In at least one example, service provider 612 can communicate with instances of a payment application (or other access point) installed on devices 606 configured for operation by users 614. In an example, an instance of the payment application executing on a first device operated by a payor can send a request to service provider 612 to transfer an amount of funds (e.g., fiat currency or non-fiat currency such as cryptocurrency, securities, and related assets) from an account of the payor to an account of a payee (e.g., a peer-to-peer payment). Service provider 612 can facilitate the transfer and can send a notification to an instance of the payment application executing on a second mobile device operated by the payee that the transfer is in process (or has been completed). In some examples, service provider 612 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some examples, service provider 612 funds the request to payee on behalf of the payor, to speed up the transfer process and compensate for any lags that may be attributed to payor's financial network.

In some implementations, service provider 612 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on user devices 606.

In some examples, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some examples, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by service provider 612. For instance, service provider 612 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 606 (e.g., mobile device or conventional personal computer (PC)) based on instructions transmitted to and from server computing device(s) 602 (which, in such an example can be called a "messaging server"). In some instances, the messaging application can include a payment application with messaging capability that enables users of the payment application to communicate with one another. In such instances, the payment application can be executed on a user device 606 based on instructions transmitted to and from the server computing device(s) 602 (e.g., the payment service discussed in this description or another payment service that supports payment transactions).

In at least some examples, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. Service provider 612 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 614 may be new to service provider 612 such that user 614 has not yet registered (e.g., subscribed to receive access to one or more services offered by the service provider) with service provider 612. Service provider 612 can offer onboarding services for registering a potential user 614 with service provider 612. In some examples, onboarding can involve presenting various questions, prompts, and the like to a potential user 614 to obtain information that can be used to generate a profile for the potential user 614. In at least one example, service provider 612 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to potential user 614 providing all necessary information, potential user 614 can be onboarded to service provider 612. In such an example, any limited or short-term access to services of service provider 612 can be transitioned to more permissive (e.g., less limited) or longer-term access to such services.

Service provider 612 can be associated with IDV services, which can be used by service provider 612 for compliance purposes and/or can be offered as a service, for instance to third-party service providers (e.g., associated with the server computing device(s) 610). That is, service provider 612 can offer IDV services to verify the identity of users 614 seeking to use or using their services. Identity verification requires a customer (or potential customer) to provide information that is used by compliance departments to prove that the information is associated with an identity of a real person or entity. In at least one example, service provider 612 can perform services for determining whether identifying information provided by a user 614 accurately identifies the customer (or potential customer) (i.e., is the customer who they say they are?).

Service provider 6612 is capable of providing additional or alternative services and the services described above are offered as a sampling of services. In at least one example, service provider 612 can exchange data with server computing device(s) 610 associated with third-party service providers. Such third-party service providers can provide information that enables service provider 612 to provide services, such as those described above. In additional or alternative examples, such third-party service providers can access services of service provider 612. That is, in some examples, the third-party service providers can be subscribers, or otherwise access, services of service provider 612.

Techniques described herein can be configured to operate in both real-time/online and offline modes. "Online" modes refer to modes when devices are capable of communicating with service provider 612 (e.g., server computing device(s) 602) and/or server computing device(s) 610 via network(s) 604. In some examples, merchant device(s) 608 are not capable of connecting with service provider 612 (e.g., server computing device(s) 602) and/or server computing device(s) 610, due to a network connectivity issue, for example. In additional or alternative examples, server computing device(s) 602 are not capable of communicating with server computing device(s) 610 due to network connectivity issue, for example. In such examples, devices may operate in "offline" mode where at least some payment data is stored (e.g., on the merchant device(s) 608) and/or server computing device(s) 602 until connectivity is restored and the payment data can be transmitted to server computing device(s) 602 and/or server computing device(s) 610 for processing.

In at least one example, service provider 612 can be associated with a hub, such as an order hub, an inventory hub, a fulfillment hub and so on, which can enable integration with one or more additional service providers (e.g., associated with additional server computing device(s) 610). In some examples, such additional service providers can offer additional or alternative services and service provider 612 can provide an interface or other computer-readable instructions to integrate functionality of service provider 612 into the one or more additional service providers.

Techniques described herein are directed to services provided via a distributed system of user devices 606 that are in communication with one or more server computing devices 602 of service provider 612. That is, techniques described herein are directed to a specific implementation—or, a practical application—of utilizing a distributed system of user devices 606 that are in communication with one or more server computing devices 602 of service provider 612 to perform a variety of services, as described above. The unconventional configuration of the distributed system described herein enables server computing device(s) 602 that are remotely-located from end-users (e.g., users 614) to intelligently offer services based on aggregated data associated with the end-users, such as users 614 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of service provider 612, and those outside of the control of service provider 612, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative merchant services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 614 and user devices 606. Furthermore, such features are changed dynamically based on the profiles of the users involved interacting with the GUIs. As such, techniques described herein are directed to improvements to computing systems.

Figure 7:
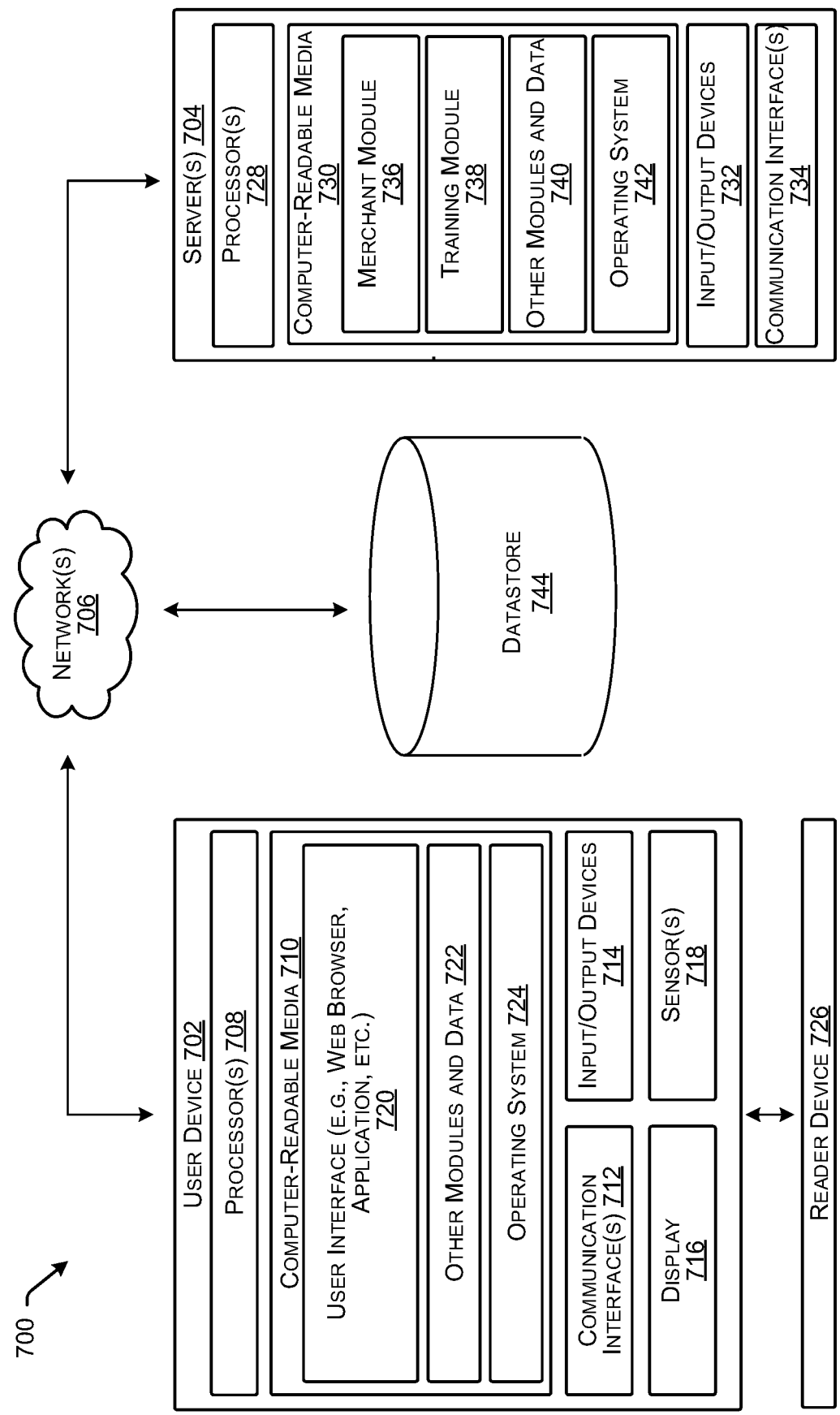
FIG. 7 illustrates additional details associated with individual components of the example environment of FIG. 6 for processing transactions.

FIG. 7 illustrates additional details associated with individual components of the environment of FIG. 6 for processing transactions. System 700 includes a user device 702 that communicates with server computing device(s) (e.g., server(s) 704) via network(s) 706 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 702 is illustrated, in additional or alternate examples, the system 700 can have multiple user devices, as described above with reference to FIG. 6.

In at least one example, user device 702 can be any suitable type of computing device, e.g., portable, semi-portable, semi-stationary, or stationary. Some examples of the user device 702 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, user device 702 can be any computing device capable of sending communications and performing the functions according to the techniques described herein. User device 702 can include devices, e.g., payment card readers or components capable of accepting payments, as described below.

In the illustrated example, user device 702 includes one or more processors 708, one or more computer-readable media 710, one or more communication interface(s) 712, one or more input/output (I/O) devices 714, a display 716, and sensor(s) 718.

In at least one example, each processor 708 can itself comprise one or more processors or processing cores. For example, processor(s) 708 can be implemented as one or more microprocessors, microcomputers, microcontrollers, digital signal processors, central processing units, state machines, logic circuitries, and/or any devices that manipulate signals based on operational instructions. In some examples, processor(s) 708 can be one or more hardware processors and/or logic circuits of any suitable type specifically programmed or configured to execute the algorithms and processes described herein. Processor(s) 708 can be configured to fetch and execute computer-readable processor-executable instructions stored in computer-readable media 710.

Depending on the configuration of user device 702, computer-readable media 710 can be an example of tangible non-transitory computer storage media and can include volatile and nonvolatile memory and/or removable and non-removable media implemented in any type of technology for storage of information such as computer-readable processor-executable instructions, data structures, program modules or other data. Computer-readable media 710 can include, but is not limited to, RAM, ROM, EEPROM, flash memory, solid-state storage, magnetic disk storage, optical storage, and/or other computer-readable media technology. Further, in some examples, user device 702 can access external storage, such as RAID storage systems, storage arrays, network attached storage, storage area networks, cloud storage, or any other medium that can be used to store information and that can be accessed by processor(s) 708 directly or through another computing device or network. Accordingly, computer-readable media 710 can be computer storage media able to store instructions, modules or components that can be executed by processor(s) 708. Further, when mentioned, non-transitory computer-readable media exclude media such as energy, carrier signals, electromagnetic waves, and signals per se.

Computer-readable media 710 can be used to store and maintain any number of functional components that are executable by processor(s) 708. In some implementations, these functional components comprise instructions or programs that are executable by processor(s) 708 and that, when executed, implement operational logic for performing the actions and services attributed above to user device 702. Functional components stored in the computer-readable media 710 can include a user interface 720 to enable users to interact with the user device 702, and thus the server(s) 704 and/or other networked devices. In at least one example, user interface 720 can be presented via a web browser, or the like. In other examples, user interface 720 can be presented via an application, such as a mobile application or desktop application, which can be provided by a service provider associated with server(s) 704, or which can be an otherwise dedicated application. In at least one example, a user can interact with the user interface via touch input, spoken input, gesture, or any other type of input. The word "input" is also used to describe "contextual" input that may not be directly provided by the user via the user interface 720. For example, user's interactions with user interface 720 are analyzed using, e.g., natural language processing techniques, to determine context or intent of the user, which may be treated in a manner similar to "direct" user input.

Depending on the type of user device 702, computer-readable media 710 can also optionally include other functional components and data, such as other modules and data 722, which can include programs, drivers, etc., and the data used or generated by the functional components. In addition, computer-readable media 710 can also store data, data structures, and the like that are used by the functional components. Further, user device 702 can include many other logical, programmatic and physical components, of which those described are merely examples that are related to the discussion herein.

In at least one example, computer-readable media 710 can include additional functional components, such as an operating system 724 for controlling and managing various functions of user device 702 and for enabling basic user interactions.

Communication interface(s) 712 can include one or more interfaces and hardware components for enabling communication with various other devices, such as over network(s) 706 or directly. For example, communication interface(s) 712 can enable communication through one or more network(s) 706, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 706 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Example embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

User device 702 can further include one or more input/output (I/O) devices 714. I/O devices 714 can include speakers, a microphone, a camera, various user controls (e.g., buttons, a joystick, a keyboard, a keypad, etc.), a haptic output device, and/or others. I/O devices 714 can also include attachments that leverage the accessories (audio-jack, USB-C, Bluetooth, etc.) to connect with user device 702.

In at least one example, user device 702 can include a display 716. Depending on the type of computing device(s) used as user device 702, display 716 can employ any suitable display technology. For example, display 716 can be a liquid crystal display, a plasma display, a light emitting diode display, an OLED (organic light-emitting diode) display, an electronic paper display, or any other suitable type of display able to present digital content thereon. In at least one example, display 716 can be an augmented reality display, a virtually reality display, or any other display able to present and/or project digital content. In some examples, display 716 can have a touch sensor associated with display 716 to provide a touchscreen display configured to receive touch inputs for enabling interaction with a graphic interface presented on display 716. Accordingly, implementations herein are not limited to any particular display technology. Alternatively, in some examples, user device 702 may not include display 716, and information can be presented by other means, such as aurally, haptically, etc.

In addition, user device 702 can include sensor(s) 718. Sensor(s) 718 can include a GPS device able to indicate location information. Further, sensor(s) 718 can include, but are not limited to, an accelerometer, gyroscope, compass, proximity sensor, camera, microphone, and/or a switch.

In some example, the GPS device can be used to identify a location of a user. In at least one example, the location of the user can be used by the service provider associated with servers 704, described above, to provide one or more services. That is, in some examples, the service provider can implement geofencing to provide particular services to users. As an example, with a lending service, location can be used to confirm that a stated purpose of a loan corresponds to evidence of use (e.g., is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users enter a brick-and-mortar store of a merchant. Location can be used in additional or alternative ways as well.

Additionally, user device 702 can include various other components that are not shown, examples of which include removable storage, a power source, such as a battery and power control unit, a barcode scanner, a printer, a cash drawer, and so forth.

In addition, in some examples, user device 702 can include, be connectable to, or otherwise be coupled to a reader device 726, for reading payment instruments and/or identifiers associated with payment objects. In some examples, as described above, reader device 726 can plug in to a port in user device 702, such as a microphone port, a headphone port, an audio-jack, a data port, or other suitable port. In additional or alternative examples, reader device 726 can be coupled to user device 702 via another wired or wireless connection, such as via a Bluetooth®, BLE, and so on. Reader device 726 can include a read head for reading a magnetic strip of a payment card, and further can include encryption technology for encrypting the information read from the magnetic strip. Additionally or alternatively, reader device 726 can be an EMV payment reader, which in some examples, can be embedded in user device 702. Moreover, numerous other types of readers can be employed with user device 702 herein, depending on the type and configuration of user device 702.

Reader device 726 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, reader device 726 may include hardware implementation, such as slots, magnetic tracks, and rails with one or more sensors or electrical contacts to facilitate detection and acceptance of a payment instrument. That is, reader device 726 may include hardware implementations to enable reader device 726 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, reader device 726 may also include a biometric sensor to receive and process biometric characteristics and process them as payment instruments, given that such biometric characteristics are registered with service provider 612 of FIG. 6 and connected to a financial account with a bank server.

Reader device 726 may include processing unit(s), computer-readable media, a reader chip, a transaction chip, a timer, a clock, a network interface, a power supply, and so on. The processing unit(s) of reader device 726 may execute one or more modules and/or processes to cause the reader device 726 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of reader device 726, the computer-readable media may include volatile memory (such as RAM), non-volatile memory (such as ROM, flash memory, miniature hard drive, memory card, or the like), or some combination thereof. In at least one example, the computer-readable media of reader device 726 may include at least one module for performing various functions as described herein.

The reader chip may perform functionalities to control the operations and processing of the reader device 726. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control a clock, which may provide a clock signal indicating a time. Furthermore, the reader chip may perform functionality to control the network interface, which may interface with network(s) 706, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 726. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While user device 702, which can be a POS terminal, and reader device 226 are shown as separate devices, in additional or alternative examples, user device 702 and reader device 726 can be part of a single device, which may be a battery-operated device. In such an example, components of both user device 702 and reader device 726 may be associated with the single device. In some examples, reader device 726 can have a display integrated therewith, which can be in addition to (or as an alternative of) display 216 associated with user device 702.

Server(s) 704 (may be referred to as payment processing system 704, which may be the same as payment processing system 108 of FIG. 1) can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of server(s) 704 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 704 can be located together or separately, and organized, for example, as virtual servers, server banks, and/or server farms. The described functionality can be provided by the servers of a single merchant or enterprise, or can be provided by the servers and/or services of multiple different customers or enterprises.

In the illustrated example, server(s) 704 can include one or more processors 728, one or more computer-readable media 730, one or more I/O devices 732, and one or more communication interfaces 734. Each processor 728 can be a single processing unit or a number of processing units, and can include single or multiple computing units or multiple processing cores. Processor(s) 728 can be implemented as one or more microprocessors, microcomputers, microcontrollers, digital signal processors, central processing units, state machines, logic circuitries, and/or any devices that manipulate signals based on operational instructions. For example, processor(s) 728 can be one or more hardware processors and/or logic circuits of any suitable type specifically programmed or configured to execute the algorithms and processes described herein. Processor(s) 728 can be configured to fetch and execute computer-readable instructions stored in computer-readable media 730, which can program processor(s) 728 to perform the functions described herein. In one example, processor(s) 728 may perform the functionalities of AI-based merchant service recommendation module 112 and/or other payment processing functionalities of payment processing system 108 of FIG. 1 and/or computing devices 602 of FIG. 6.

Computer-readable media 730 can include volatile and nonvolatile memory and/or removable and non-removable media implemented in any type of technology for storage of information, such as computer-readable instructions, data structures, program modules, or other data. Such computer-readable media 730 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of server(s) 704, computer-readable media 730 can be a type of computer-readable storage media and/or can be a tangible non-transitory media to the extent that when mentioned, non-transitory computer-readable media exclude media such as energy, carrier signals, electromagnetic waves, and signals per se.

Computer-readable media 730 can be used to store any number of functional components that are executable by processor(s) 728. In many implementations, these functional components comprise instructions or programs that are executable by the processors 728 and that, when executed, specifically configure one or more processors 728 to perform the actions attributed above to the service provider and/or payment processing service associated with server(s) 704. Functional components stored in computer-readable media 730 can optionally include a merchant module 736, a training module 738, and one or more other modules and data 740.

The merchant module 736 can be configured to receive transaction data from POS systems, such as user device 702 configured to operate as a POS device by a corresponding merchant (and/or POS system 624 of FIG. 6). Merchant module 736 can transmit requests (e.g., authorization, capture, settlement, etc.) to payment service server computing device(s) to facilitate POS transactions between merchants and customers. Merchant module 736 can communicate the successes or failures of the POS transactions to the POS systems.

Training module 738 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore 744 associated with user device(s) 702 and/or server(s) 704 for use at a time after the data models have been trained (e.g., at runtime).

One or more other modules and data 740 can include programs, drivers, etc., and the data used or generated by the functional components. Further, server(s) 704 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

Computer-readable media 730 can additionally include an operating system 742 for controlling and managing various functions of server(s) 704.

Communication interface(s) 734 can include one or more interfaces and hardware components for enabling communication with various other devices, such as over network(s) 706 or directly. For example, communication interface(s) 734 can enable communication through one or more network(s) 706, which can include, but are not limited to, any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 706 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Server(s) 704 can further be equipped with various I/O devices 732. Such I/O devices 732 can include a display, various user interface controls (e.g., buttons, joystick, keyboard, mouse, touch screen, biometric or sensory input devices, etc.), audio speakers, connection ports and so forth.

In at least one example, system 700 can include a datastore 744 that can be configured to store data that is accessible, manageable, and updatable. In some examples, datastore 744 can be integrated with user device 702 and/or server(s) 704. In other examples, as shown in FIG. 7, datastore 744 can be located remotely from the server(s) 704 and can be accessible to the server(s) 704. Datastore 744 can comprise multiple databases and/or servers connected locally and/or remotely via the network(s) 706.

In at least one example, datastore 744 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), MCC, item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, datastore 744 can store inventory database(s) and/or catalog database(s). As described above, an inventory can store data associated with a quantity of each item that a merchant has available to the merchant. Furthermore, a catalog can store data associated with items that a merchant has available for acquisition. Datastore 744 can store additional or alternative types of data as described herein.

With various examples of payment processing systems, user and merchant devices and/or other system components described above with reference to FIGS. 6 and 7, the disclosure now turns to examples of inventive concepts for utilizing machine-trained models (trained neural networks for automatically recommending merchant services to various merchants that utilize the example payment processing systems described above with reference to FIGS. 1 and 2. In order to implement these inventive concepts, example neural networks to be trained and utilized (e.g., via training module 738 of FIG. 7) by payment processing systems (e.g., server(s) 704 of FIG. 7) for merchant service recommendations, will be described next with reference to FIG. 8.

Figure 8:
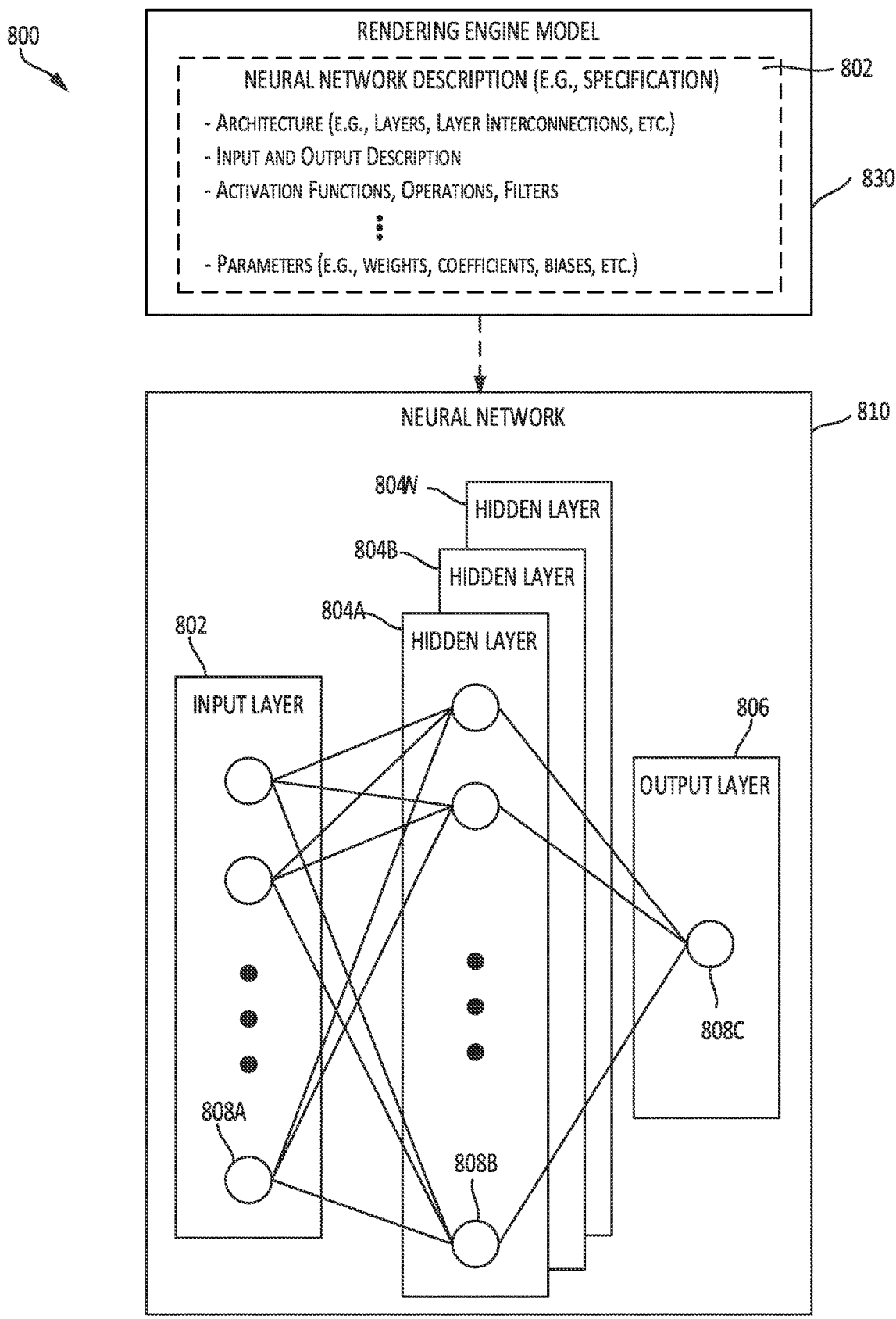
FIG. 8 illustrates an example neural network architecture that can be trained for implementing merchant service recommendation techniques described herein.

FIG. 8 illustrates an example neural network architecture that can be trained for implementing merchant service recommendation techniques described herein. Architecture 800 includes a neural network 810 defined by an example neural network description 802 stored in rendering engine model 830. Neural network 810 can represent a neural network implementation for any one of trained neural networks utilized as part of module 200 of FIG. 2. Neural network description 802 can include a full specification of neural network 810. For example, neural network description 802 can include: a description or specification of neural network 810 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

In this example, neural network 810 includes an input layer 802, which includes input data such as merchant profile data or merchant service data, as appropriate. Merchant profile data, as described above with reference to FIGS. 2 and 3A-3C, can include numerical features, categorical features and information on past conversions of merchant services by the corresponding merchant. While such input data is reflective of inputs to trained neural networks such as neural network 810, when deployed and utilized for AI-based merchant service recommendation in real-time, neural network 810 and/or other networks utilized may be trained first using similar input data already collected (e.g., stored in datastore 744 of FIG. 7) by payment processing system 108. A portion of the training data set may be used for testing and validating the trained neural networks. Furthermore, when deployed in real-time, each time payment processing system 108 generates a ranked list of merchant service recommendations (as will be described above with reference to FIG. 3C), the resulting data may be used to refine and update the corresponding neural networks, thus providing a continuous updating of the utilized neural networks.

Neural network 810 includes hidden layers 804A through 804N (collectively "804" hereinafter). Hidden layers 804 can include n number of hidden layers, where n is a positive integer greater than or equal to one. The number of hidden layers can include as many layers as needed for a desired processing outcome and/or rendering intent. Neural network 810 further includes an output layer 806 that provides an output from the processing performed by hidden layers 804. In one illustrative example, output layer 806 can provide numerical representations of merchants and merchant services in the same vector space for comparison and ranking, as described above with reference to FIGS. 1 through 5A-5C.

In one example, neural network 810 is a multi-layer neural network of interconnected nodes. Each node can represent a piece of information. Information associated with the nodes is shared among the different layers and each layer retains information as information is processed. In some cases, neural network 810 can include a feed-forward neural network (e.g., as described above with reference to module 200 of FIG. 2), in which case there are no connections between nodes that form an enclosed cycle, or where outputs of the neural network are fed back into itself. In other cases, neural network 810 can include a recurrent neural network, such as a Hopfield network, which can have loops that allow information to be carried across nodes while reading in input. Some recurrent neural networks can be simplified as feed-forward neural networks, while others can only be implemented as recurrent neural networks. Another example neural network can be a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 810 can represent any other neural or deep learning network, such as an autoencoder, a deep belief nets (DBNs), a recurrent neural networks (RNNs), etc.

Information can be exchanged between nodes through node-to-node interconnections between the various layers. Nodes of input layer 802 can activate a set of nodes in first hidden layer 804A. For example, as shown, each of the input nodes of input layer 802 is connected to each of the nodes of first hidden layer 804A. The nodes of hidden layer 804A can transform the information of each input node by applying activation functions to the information. The information derived from the transformation can then be passed to and can activate the nodes of the next hidden layer (e.g., 804B), which can perform their own designated functions. Example activation functions include convolutional, up-sampling, data transformation, pooling, and/or any other suitable functions. The output of the hidden layer (e.g., 804B) can then activate nodes of the next hidden layer (e.g., 804N), and so on. The output of the last hidden layer can activate one or more nodes of output layer 806, at which point an output can be provided. In some cases, while nodes (e.g., nodes 808A, 808B, 808C) in neural network 810 are shown as having multiple output lines, a node has a single output and all lines shown as being output from a node represent the same output value.

In some cases, each node or interconnection between nodes can have a weight that is a set of parameters derived from training neural network 810. For example, an interconnection between nodes can represent a piece of information learned about the interconnected nodes. The interconnection can have a numeric weight that can be tuned (e.g., based on a training dataset), allowing neural network 810 to be adaptive to inputs and able to learn as more data is processed.

Neural network 810 can be pre-trained to process the features from the data in input layer 802 using the different hidden layers 804 in order to provide the output through output layer 806. In some cases, neural network 810 can adjust weights of nodes using a training process called backpropagation. Backpropagation uses the difference between the output of neural network 810 and the desired output to compute an error in the calculation made by neural network 810. This error can then be passed among the nodes of neural network 810 to adjust weights and result in a more accurate calculation of the desired output. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for neural network 810, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, neural network 810 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. Neural network 810 can perform a backward pass by determining which inputs (weights) most contributed to the loss of neural network 810, and can adjust the weights so that the loss decreases and is eventually minimized.

A derivative of the loss with respect to the weights can be computed to determine the weights that contributed most to the loss of neural network 810. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates. Accordingly, a defined neural network can be trained as desired to be used as any one of trained neural networks of AI-based merchant service recommendation module 112 of FIG. 1 to generate customized list of merchant service recommendation for different merchants.

The phrases "in some examples," "according to various examples," "in the examples shown," "in one example," "in other examples," "various examples," "some examples," and the like generally mean the particular feature, structure, or characteristic following the phrase is included in at least one example of the present disclosure, and may be included in more than one example of the present disclosure. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 3A-3C and 4 for convenience and ease of understanding. However, the methods illustrated are not limited to being performed using components described in FIGS. 3A-3C and 4, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some example embodiments, one or more blocks of the process can be omitted entirely. Moreover, the methods can be combined in whole or in part with each other or with other methods.

For clarity of explanation, in some instances the various example embodiments may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising: receiving, by a payment processing system, merchant profile data describing attributes of merchants, each of the merchants having an account with the payment processing system, wherein the payment processing system is configured to support a plurality of merchant services for use by the merchants in running and managing their respective businesses; generating, by the payment processing system and using a first machine-trained model, first profiles for each of the merchants, wherein the first machine-trained model is configured to receive a numerical representation of the merchant profile data as input and provide, as an output, one of the first profiles for each of the merchants; generating, by the payment processing system, merchant service recommendations for at least one of the merchants using the first profiles, each merchant service recommendation offering a service in relation to a particular aspect of a business of the at least one merchant, wherein the merchant service recommendations are generated based on a correlation between a corresponding one of the first profiles for the at least one merchant and a corresponding one of the merchant service recommendations; continuously updating a graphical user interface of a merchant computing device of the at least one merchant with one or more of the merchant service recommendations; receiving a selection of at least one merchant service from the one or more of the merchant service recommendations presented on the graphical user interface; configuring the merchant computing device of the at least one merchant to surface at least one interactive element on the graphical user interface to perform functionalities associated with the at least one merchant service selected from the one or more of the merchant service recommendations; and re-training the machine-trained model to generate the first profiles and the merchant service recommendations in near real-time.

2. The method of claim 1, further comprising: generating, by the payment processing system and using a second machine-trained model, second profiles for the plurality of merchant services using at least one type of description for the plurality of merchant services, wherein each of the plurality of merchant services is transformed using natural language processing and provided as input into the one or more machine-trained models to generate the second profiles, wherein the merchant service recommendations for the at least one merchant are generated using the first profiles and the second profiles.

3. The method of claim 2, wherein the first machine-trained model and the second machine-trained model are the same.

4. The method of claim 2, wherein the correlation is between the corresponding one of the first profiles and the second profiles.

5. The method of claim 1, wherein the one or more merchant service recommendations on the graphical user interface includes at least two categories of merchant services, the at least two categories of merchant services each including one or more merchant services directed to different and unrelated aspects of a merchant's business.

6. The method of claim 1, wherein the merchant profile data for each of the merchants includes: one or more numerical features associated with each of the merchants; information identifying categorical features associated with each of the merchants; and information on previous merchant service conversions by each of the merchants.

7. The method of claim 6, wherein generating the first profiles comprises: generating, using the first machine-trained model, a first numerical representation corresponding to the one or more numerical features of each of the merchants, generating, using the first machine-trained model, a second numerical representation corresponding to the categorical features associated with each of the merchants, generating, using the first machine-trained model, a third numerical representation corresponding to the previous merchant service conversions by each of the merchants; and generating a corresponding one of the first profiles for each of the merchants based on the first numerical representation, the second numerical representation and the third numerical representation.

8. One or more non-transitory computer-readable media comprising computer-readable instructions, which when executed by one or more processors of a payment processing system, cause the payment processing system to: receive merchant profile data describing attributes of merchants, each of the merchants having an account with the payment processing system, wherein the payment processing system is configured to support a plurality of merchant services for use by the merchants in running and managing their respective businesses; generate, using a first machine-trained model, first profiles for each of the merchants, wherein the first machine-trained model is configured to receive a numerical representation of the merchant profile data as input and provide, as an output, one of the first profiles for each of the merchants; generate merchant service recommendations for at least one of the merchants using the first profiles, each merchant service recommendation offering a service in relation to a particular aspect of a business of the at least one merchant, wherein the merchant service recommendations are generated based on a correlation between a corresponding one of the first profiles for the at least one merchant and a corresponding one of the merchant service recommendations; continuously update a graphical user interface of a merchant computing device of the at least one merchant with one or more of the merchant service recommendations; receive a selection of at least one merchant service from the one or more of the merchant service recommendations presented on the graphical user interface; configure the merchant computing device of the at least one merchant to surface at least one interactive element on the graphical user interface to perform functionalities associated with the at least one merchant service selected from the one or more of the merchant service recommendations; and re-train the machine-trained model to generate the first profiles and the merchant service recommendations in near real-time.

9. The one or more non-transitory computer-readable media of claim 8, wherein the execution of the computer-readable instructions by the one or more processors further cause the payment processing system to: generate, using a second machine-trained model, second profiles for the plurality of merchant services using at least one type of description for the plurality of merchant services, wherein each of the plurality of merchant services is transformed using natural language processing and provided as input into the one or more machine-trained models to generate the second profiles, wherein the merchant service recommendations for the at least one merchant are generated using the first profiles and the second profiles.

10. The one or more non-transitory computer-readable media of claim 9, wherein the first machine-trained model and the second machine-trained model are the same.

11. The one or more non-transitory computer-readable media of claim 9, wherein the correlation is between the corresponding one of the first profiles and the second profiles.

12. The one or more non-transitory computer-readable media of claim 8, wherein the one or more merchant service recommendations on the graphical user interface includes at least two categories of merchant services, the at least two categories of merchant services each including one or more merchant services directed to different and unrelated aspects of a merchant's business.

13. The one or more non-transitory computer-readable media of claim 8, wherein the merchant profile data for each of the merchants includes: one or more numerical features associated with each of the merchants; information identifying categorical features associated with each of the merchants; and information on previous merchant service conversions by each of the merchants.

14. The one or more non-transitory computer-readable media of claim 13, wherein the execution of the computer-readable instructions by the one or more processors further cause the payment processing system to generate the first profiles by: generating, using the first machine-trained model, a first numerical representation corresponding to the one or more numerical features of each of the merchants, generating, using the first machine-trained model, a second numerical representation corresponding to the categorical features associated with each of the merchants, generating, using the first machine-trained model, a third numerical representation corresponding to the previous merchant service conversions by each of the merchants; and generating a corresponding one of the first profiles for each of the merchants based on the first numerical representation, the second numerical representation and the third numerical representation.

15. A payment processing system comprising: one or more memories having computer-readable instructions stored therein, and one or more processors configured to execute the computer-readable instructions to: receive merchant profile data describing attributes of merchants, each of the merchants having an account with the payment processing system, wherein the payment processing system is configured to support a plurality of merchant services for use by the merchants in running and managing their respective businesses; generate, using a first machine-trained model, first profiles for each of the merchants, wherein the first machine-trained model is configured to receive a numerical representation of the merchant profile data as input and provide, as an output, one of the first profiles for each of the merchants; generate merchant service recommendations for at least one of the merchants using the first profiles, each merchant service recommendation offering a service in relation to a particular aspect of a business of the at least one merchant, wherein the merchant service recommendations are generated based on a correlation between a corresponding one of the first profiles for the at least one merchant and a corresponding one of the merchant service recommendations; continuously update a graphical user interface of a merchant computing device of the at least one merchant with one or more of the merchant service recommendations; receive a selection of at least one merchant service from the one or more of the merchant service recommendations presented on the graphical user interface; configure the merchant computing device of the at least one merchant to surface at least one interactive element on the graphical user interface to perform functionalities associated with the at least one merchant service selected from the one or more of the merchant service recommendations; and re-train the machine-trained model to generate the first profiles and the merchant service recommendations in near real-time.

16. The payment processing system of claim 15, wherein the one or more processors are further configured to execute the computer-readable instructions to generate, using a second machine-trained model, second profiles for the plurality of merchant services using at least one type of description for the plurality of merchant services, wherein each of the plurality of merchant services is transformed using natural language processing and provided as input into the one or more machine-trained models to generate the second profiles, wherein the merchant service recommendations for the at least one merchant are generated using the first profiles and the second profiles.

17. The payment processing system of claim 16, wherein the first machine-trained model and the second machine-trained model are the same.

18. The payment processing system of claim 16, wherein the correlation is between the corresponding one of the first profiles and the second profiles.

19. The payment processing system of claim 15, wherein the merchant profile data for each of the merchants includes: one or more numerical features associated with each of the merchants; information identifying categorical features associated with each of the merchants; and information on previous merchant service conversions by each of the merchants.

20. The payment processing system of claim 19, wherein the one or more processors are further configured to execute the computer-readable instructions to generate the first profiles by: generating, using the first machine-trained model, a first numerical representation corresponding to the one or more numerical features of each of the merchants, generating, using the first machine-trained model, a second numerical representation corresponding to the categorical features associated with each of the merchants, generating, using the first machine-trained model, a third numerical representation corresponding to the previous merchant service conversions by each of the merchants; and generating a corresponding one of the first profiles for each of the merchants based on the first numerical representation, the second numerical representation and the third numerical representation.

* * * * *